(12) United States Patent
Gheorghe et al.

(10) Patent No.: US 7,231,419 B1
(45) Date of Patent: Jun. 12, 2007

(54) SYSTEM AND METHOD FOR ADAPTIVELY SELECTING AND DELIVERING RECOMMENDATIONS TO A REQUESTER

(75) Inventors: Christian Gheorghe, Denver, CO (US); Qingwei Lou, Englewood, CO (US); James Marcus Mayer, Parker, CO (US)

(73) Assignee: OutlookSoft Corporation, Stamford, CT (US)

( * ) Notice: Subject to any disclaimer, the term of this patent is extended or adjusted under 35 U.S.C. 154(b) by 663 days.

(21) Appl. No.: 10/032,895

(22) Filed: Oct. 19, 2001

(51) Int. Cl.
G06F 15/16 (2006.01)

(52) U.S. Cl. .............................. 709/203; 707/3; 707/6; 707/10

(58) Field of Classification Search ................ 709/203, 709/200, 223, 224; 707/3–6, 10
See application file for complete search history.

(56) References Cited

U.S. PATENT DOCUMENTS

| | | | | |
|---|---|---|---|---|
| 5,704,017 | A | 12/1997 | Heckerman et al. | 395/61 |
| 6,038,601 | A | 3/2000 | Lambert et al. | 709/226 |
| 6,064,980 | A * | 5/2000 | Jacobi et al. | 705/26 |
| 6,088,718 | A | 7/2000 | Altschuler et al. | 709/203 |
| 6,092,049 | A * | 7/2000 | Chislenko et al. | 705/10 |
| 6,108,493 | A | 8/2000 | Miller et al. | 395/200.49 |
| 6,144,944 | A | 11/2000 | Kurtzman, II et al. | 705/14 |
| 6,195,657 | B1 * | 2/2001 | Rucker et al. | 707/5 |
| 6,202,058 | B1 | 3/2001 | Rose et al. | 706/45 |
| 6,236,980 | B1 * | 5/2001 | Reese | 705/36 R |
| 6,256,163 | B1 | 7/2001 | Schmidt et al. | 360/78.09 |
| 6,334,127 | B1 * | 12/2001 | Bieganski et al. | 707/5 |
| 6,346,952 | B1 * | 2/2002 | Shtivelman | 715/758 |
| 6,360,227 | B1 * | 3/2002 | Aggarwal et al. | 707/102 |
| 6,370,513 | B1 * | 4/2002 | Kolawa et al. | 705/10 |
| 6,438,579 | B1 * | 8/2002 | Hosken | 709/203 |
| 6,493,702 | B1 * | 12/2002 | Adar et al. | 707/3 |
| 6,567,797 | B1 * | 5/2003 | Schuetze et al. | 707/2 |
| 6,636,836 | B1 * | 10/2003 | Pyo | 705/26 |
| 6,681,369 | B2 * | 1/2004 | Meunier et al. | 715/511 |
| 6,687,690 | B2 * | 2/2004 | Kelkar | 707/3 |
| 6,687,696 | B2 * | 2/2004 | Hofmann et al. | 707/6 |
| 6,708,174 | B1 * | 3/2004 | Tenorio | 707/10 |
| 6,819,931 | B2 * | 11/2004 | Amerga et al. | 455/456.6 |
| 6,845,374 | B1 * | 1/2005 | Oliver et al. | 707/5 |
| 6,865,565 | B2 * | 3/2005 | Rainsberger et al. | 706/47 |
| 6,904,408 | B1 * | 6/2005 | McCarthy et al. | 705/2 |
| 6,981,040 | B1 * | 12/2005 | Konig et al. | 709/224 |

OTHER PUBLICATIONS

"Analysis of Recommendation Algorithms for E-Commerce," by Badrul Sarwar, George Karypis, Joseph Konstan, and John Riedl; GroupLens Research Group, Army HPC Research Center, Department of Computer Science and Engineering, University of Minnesota, Minneapolis, MN 55455.

* cited by examiner

Primary Examiner—Saleh Najjar
Assistant Examiner—Faruk Hamza
(74) Attorney, Agent, or Firm—Wilmer Cutler Pickering; Hale and Dorr LLP

(57) ABSTRACT

A system and method for employing a number of producer modules to produce and deliver recommendations to a requester. Each of the recommendations having associated therewith a confidence level. Each of the producer modules having associated therewith a weighting value. The confidence levels in each of the recommendations produced by the producers being modified based on weighting value associated with the producer that produced the produced recommendation. The weighing values associated with each of the producer modules being modified based on information from the requester related to the recommendations delivered to the requester.

54 Claims, 9 Drawing Sheets

SYSTEM AND METHOD FOR ADAPTIVELY SELECTING AND DELIVERING RECOMMENDATIONS TO A REQUESTER

BACKGROUND OF THE INVENTION

In recent times, the Internet and the World Wide Web (WWW or web) have allowed computer or web users access to a great wealth of information. In particular, the WWW has allowed Internet users access to almost unlimited information and web content (e.g., links, web pages, banner ads, editorial information, merchandise, graphics, videos, etc.). One problem associated with the enormity of web content is that it has become increasingly difficult for a user to sort through the available content to find that which is both relevant and compelling to the user. Additionally, this plethora of web content may overwhelm a web user. However, while many web users do not want to be overwhelmed with web content, they also do not want to feel unduly limited in their access to web content.

In response or in reaction to these problems, many web users are becoming increasingly selective and specific about the web content they seek out and the manner in which web content is presented to them. To address this increase in user selectivity, web content providers have adopted a number of techniques or methods to help determine or select content which is relevant to a particular web user and to present or deliver this content to the user.

One approach to selecting relevant web content involves the use of what are commonly referred to as recommendation systems. Recommendation systems typically employ statistics-based and/or knowledge-based discovery techniques to select content for delivery to a web user during live user interactions on a website. One of the most widely used methods or algorithms employed by recommendation systems in selecting content for delivery to a web user is collaborative filtering. Recommendation systems that employ collaborative filtering methods are typically referred to as "collaborative filtering systems." Collaborative filtering systems attempt to predict the preferences of a user based on known attributes of that user as compared with known attributes and preferences of other users. Many collaborative filtering systems gather such user information by either explicitly asking for the information or by having the user rate web content. This information is then stored within a user profile. To identify content that may be relevant to a particular user, the collaborative filtering system then correlates the user's profile to the profiles of other users to identify users with similar likes or preferences. The collaborative filtering system then provides content to that particular user based on those similar preferences. The content is typically provided to the user in the form of hypertext links, pop-up windows, advertisements, and the like.

As noted, collaborative filtering systems of this type require a user to be identified, so that the user's profile may be compared to other user's profiles. This identification may be done overtly, such as by having a user identify themselves at the time they enter a website, or covertly, such as by placing a "cookie" on the user's computer system. While collaborative filtering systems of this type can be quite effective in certain web environments and with certain web users, there are a number other situations where this type of system may be ineffective.

First, this type of system is typically ineffective with web users who do not wish to be identified on the web. Many web users consider user identification on websites to be an invasion of privacy. Often times, these users will exit, and will not return to, a website that requires them to be identified. As such, websites employing overt user identification techniques are necessarily limited to attracting web visits from only those users who will freely identify themselves. Furthermore, for those systems which use cookies to covertly identify a user, there may still be problems associated with identifying a user. For example, many users find cookies to be intrusive and/or disruptive to their systems and, therefore, will configure their computer systems to prevent the placement of cookies thereon. Furthermore, often times administrators of large networks will set firewalls to prevent cookies from being placed on the computers on their network. If the cookie cannot be placed on the user's systems, collaborative filtering systems which use cookies to identify or track users will not be effective in selecting relevant content for a user, and in some cases will not function at all.

Secondly, as noted above, some collaborative filtering systems gather user information by having a user rate web content at some point in their visit to a website. While these types of systems may avoid the problems discussed above with respect to identifying a user, these systems typically have other problems associated therewith. For example, as is known, the amount of time a user spends on a website is typically limited, often times to only a few minutes or seconds. As such, every second a user spends viewing the content of the website is valuable to the operator of the website. By requiring users of a website to take the time to rate web content, these systems often reduce the amount of time that a user would normally spend viewing the content of the website. This "lost time" is often detrimental to the operator of the website. For example, this "lost time" may translate to lost sales on a website.

Another problem associated with collaborative filtering systems which require a user to rate web content is that many users simply do not wish to take the time to rate the web content. In fact, many users will exit a website rather than take the time to complete these types of tasks.

Yet another problem associated with collaborative filtering systems which use web content rating is that the content rating process typically relates to one particular field of interest such as, for example, books or movies. As such, collaborative filtering systems employing content rating are usually effective only when a user is accessing web pages related to that particular field of interest. The systems are typically ineffective when the user "changes course" and accesses web pages not directly related to the field of interest to which the content rating process is related.

While many collaborative filtering systems gather user information by explicitly asking for the information or by having the user rate web content, other types of collaborative filtering systems do not use, or limit the use of, cookies or web content ratings. Rather, these types of collaborative filtering systems typically keep track of individual user sessions during a single visit to a website. That is, all activities related to a single user session on the website are gathered and this information is used to identify or predict the preferences of the user without requiring identification of the specific user. While these types of collaborative filtering systems can be very effective for a given type of product, subject matter, and/or web user, they typically are not effective for websites having a diversity of products, subject matter, and/or users. Additionally, while a given collaborative filtering system of this type may be effective over a given period of time, trends in web usage or user behavior may decrease the effectiveness of the system during other periods of time. That is, the effectiveness of these types of systems may ebb and wane over the course of time.

Another approach to recommending web content and, in particular to recommending advertisements to be displayed on a user's computer, involves the use of an advertising server employing an affinity engine. In general, affinity engines used in advertising servers select advertisements for delivery to web users based on a user's inclusion in one or more affinity groups. The term affinity group typically refers to a group of web users having similar preferences or characteristics. In typical systems of this type, one user may be associated with a number of different demographic groups. For example, one demographic group may relate to a specific geographic area while another demographic group may relate to interest in a particular subject matter, etc. The function of an affinity engine is to associate a user with one or more affinity or demographic groups and to deliver advertisements to the user that are targeted to the particular group or groups in which the user is a member.

One variation on the single affinity engine advertisement server employs the use of a number of affinity engines and a control program for controlling the selection of the advertisements from the affinity engines. In one such system, each of the affinity engines employed by the system determines advertisements based on user request information. Each affinity engine in this type of advertisement server may use different request information, such as demographic information, page sponsor information, keyword sponsor information, and type of web browser, etc., to determine appropriate advertisements for delivery to the user. The advertisements recommended by the various affinity engines are then given an affinity value indicative of the affinity of the advertisement with user characteristics or request information. Additionally, the affinity value of an advertisement may be adjusted in various ways. For example, the advertisements recommended by one affinity engine may be adjusted based on whether that advertisement has been recommended by another engine.

As with collaborative filtering systems, advertising servers employing affinity engines, whether single or multiple affinity engines, typically require some identification of the user before appropriate advertisements may be selected for delivery to the user. This identification may occur, as described above, either overtly or covertly. Again, as with collaborative filtering systems, due to this requirement of user identification, advertisement servers employing affinity engines of this type are often ineffective in recommending content for users who either do not wish to go through the profile building process and/or for users who wish to remain anonymous.

Systems such as those using collaborative filtering or affinity engines are generally most effective in determining or predicting content that is relevant to a given user when the system has acquired a significant amount of information regarding the user's past behavior and interests. However, systems that rely on past user behavior to predict future user desires or needs may be ineffective in certain situations. For example, when a user is shopping for items for another individual, when a user's tastes or needs change, or when a sufficient amount of information regarding the user's past behavior has not been acquired by the system, such as with a new user of the system.

It is with respect to this and other background information that the present invention has evolved.

SUMMARY OF THE INVENTION

Against this backdrop the present invention described herein has been developed. Various embodiments of the present invention relate to systems and methods for selecting and delivering recommendations to a requester over a computer network. Embodiments of the present invention may employ a plurality of recommendation producers to produce lists of initial recommendations. Each of the recommendations in a particular initial recommendation list is preferably weighted based on the relative past effectiveness of the recommendation producer that produced the particular list of initial recommendations, as compared to the past effectiveness of other recommendation producers. A final list of recommendations is then selected from the initial lists of recommendation for delivery to the requester, preferably without the need to track specific user behavior, such as by the use of cookies, or to establish, maintain, or utilize affinity relationships between users and prospective recommendations.

One embodiment of the present invention relates to a recommendation system for delivering a list of recommendations to a requester system over a computer network. The recommendation system includes a plurality of producer modules and a recommendation engine. Each of the plurality of producer modules is in communication with the requester system and is operable to produce a list of initial recommendations in response to a request for recommendations from the requester system. Each of the recommendations in a list of initial recommendations preferably includes a confidence level and a producer identifier.

In this system, the recommendation engine includes a weighting module, a recommendation module, and an adjustment module. The weighting module modifies each of the confidence levels in a given list of initial recommendations based on a weighting value associated with the producer module that produced the given list of initial recommendations. The recommendation module selects one or more of the recommendations from the lists of initial recommendations based on the confidence levels of the recommendations, to produce a list of survived recommendations and transmitting the list of survived recommendations to the recommendation system. Additionally, the adjustment module preferably adjusts the weighting values associated with each of the producer modules based on information from the requester system related to the list of survived recommendations transmitted to the requester system.

Another embodiment of the present invention relates to a method of adaptively weighing producer modules in a recommendation system employing a plurality of producer modules, wherein each producer module has an associated weighting value. In this method, one or more recommendations are received from each of a plurality of producer modules. Each of the received recommendation preferably includes a producer identifier indicating the producer module that produced the received recommendation. A plurality of survived recommendations selected from the received recommendations are then transmitted to a requester system. Information from the requester system related to the plurality of survived recommendations transmitted to the requester system is then received and each of the weighting values is modified based on the information received from the requester system.

These and various other features as well as advantages that characterize the present invention will be apparent from a reading of the following detailed description and a review of the associated drawings.

DETAILED DESCRIPTION

In general, the present invention relates to systems and methods for adaptively selecting and delivering recommendations to a user over a communications network in real-time. More particularly, the present invention relates to a system that, upon receipt of a request for recommendations, employs a number of producer modules to produce recommendations which are relevant to the requester.

Figure 1:
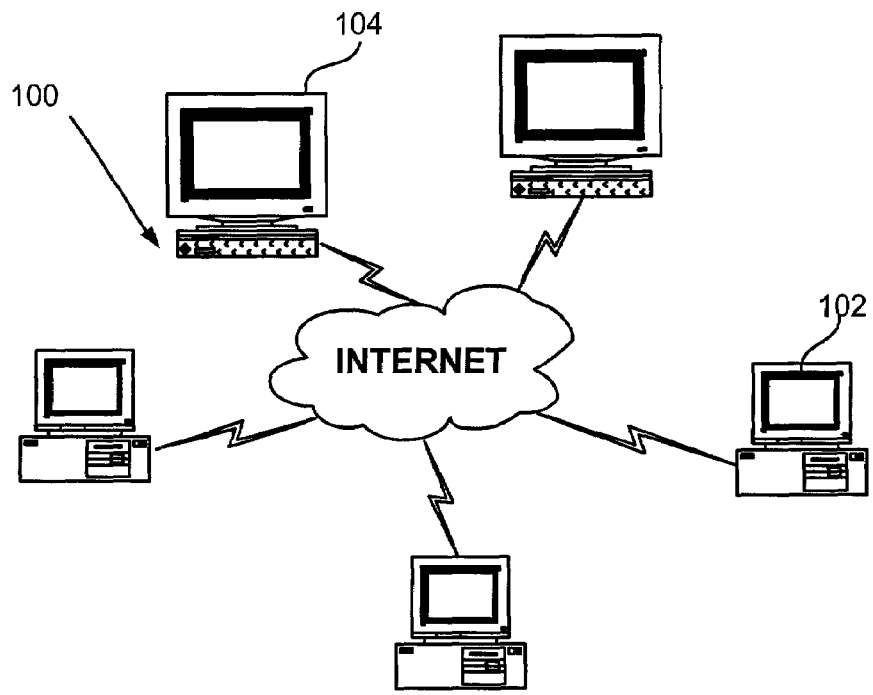
FIG. 1 is a block diagram of an exemplary operating environment for practicing various aspects of the present invention.

FIG. 1, illustrates an example of a suitable operating environment in which various embodiments of the present invention may be implemented. The present invention may be implemented as part of a communications network 100 having a client computer system 102 and at least one server computer system 104, as shown in FIG. 1. In such a communications network 100, the client computer system 102 communicates with the server computer system 104 over a network connection, such as the Internet 106. Although shown as a network 100 utilizing a client computer systems and a network computer systems 104 communicating over the Internet 106, those skilled in the art will appreciate that the concepts of the present invention may be realized in many different network configurations involving requests made by one computer process or system 102 and received by another computer process or system.

As described, various embodiments of the present invention relate to systems or methods for adaptively selecting and delivering recommendations in response to a request for recommendations. Various elements of these systems and methods are described herein as computer-implemented processes, programs, methods and/or systems. The logical operations of these various elements are preferably implemented as software routines, such as a sequence or sequences of computer-implemented acts, computer-executed code, or computer program modules running on a computing system, such as server computer system 104. As will be understood by one skilled in the art, the logical operations described herein with respect to these elements may be implemented, all or in part, in software, in firmware, in special purpose digital logic, and/or any combination thereof without deviating from the spirit and scope of the present invention as recited within the claims attached hereto. Furthermore, the various software routines or software modules described herein may be implemented by any means as is known in the art. For example, any number of computer programming languages, such as Java, "C", "C++", Pascal, FORTRAN, assembly language, etc., may be used. Furthermore, various programming approaches such as procedural, object oriented or artificial intelligence techniques may be employed.

Figure 2:
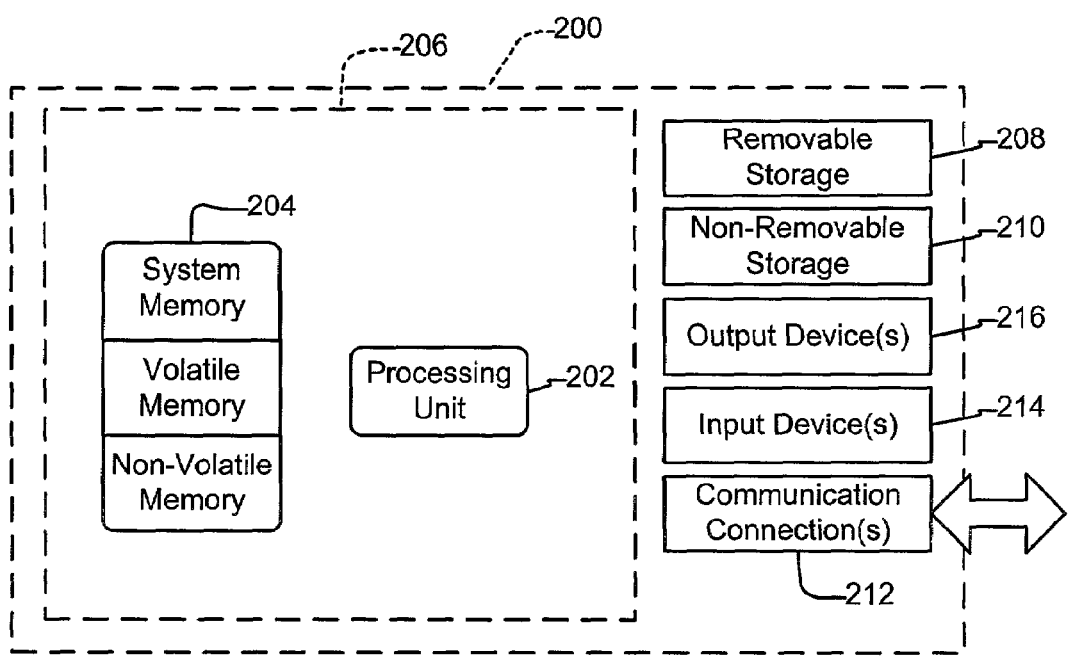
FIG. 2 is a block diagram of an exemplary computer system for practicing various aspects of the present invention.

One example of a computer system 200 for implemented various software routines, sequence or sequences of computer-implemented acts, computer-executed code, or computer program modules of the present invention is illustrated in FIG. 2. For example, the server computer system of FIG. 1, may be a computer system, such as computer system 200. The specific hardware arrangement shown in FIG. 2 does not form part of the invention itself. The computer system 200 is only one example of a suitable computing environment and is not intended to suggest any limitation as to the scope of use or functionality of the invention. In a basic configuration, the computer system 200 typically includes at least one processing unit 202 and a memory 204. Depending on the exact configuration and type of computing device, the memory 204 may be volatile (such as RAM), non-volatile, (such as ROM, flash memory, etc.), or some combination of the two. This basic configuration of the computer system 200 is illustrated in FIG. 2, by dashed line 206. Additionally, the computer system 200 may contain additional features and functionality. For example, the computer system 200 may also include additional storage (removable and/or non-removable) including, but not limited to, magnetic or optical disks or tape. Such additional storage is illustrated in FIG. 2 by removable storage 208 and non-removable storage 210.

The computer system 200 may include a variety of computer storage media. Computer storage media includes volatile and nonvolatile, removable and non-removable media implemented in any method or technology for storage of information such as computer readable instructions, data structures, program modules or other data. The memory 204, the removable storage 208, and the non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer system 200. Any such computer storage media may be part of the computer system 200.

The computer system 200 may also contain a communications connection(s) 212 that allows the computer system 200 to communicate with another computer system. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The computer system 200 may also have an input device(s) 214 such as keyboard, mouse, pen, voice input device, touch input device, etc. An output device(s) 216, such as a display, speakers, printer, etc., may also be included. All these devices are well known in the art and need not be discussed at length here.

The computer system 200 may operate in a networked environment using logical connections to one or more remote computing systems or devices, such as the client computer system 102 of FIG. 1. The remote computing system may be a personal computer, a server, a router, a network PC, a peer device, a "dumb" terminal, or other common network node, and typically includes many or all of the elements described above relative to the computer system 200. It will be understood that the computer system 200 and the remote computing system may be connected in any number of ways, as is well known in the art. For example, the computer system 200 and the remote computing system may be connected via a local area network (LAN) or a wide area network (WAN), but may also be connected using other network configurations or environments. Such networking environments are commonplace in offices, enterprise-wide computer networks, intranets and the Internet.

Figure 3:
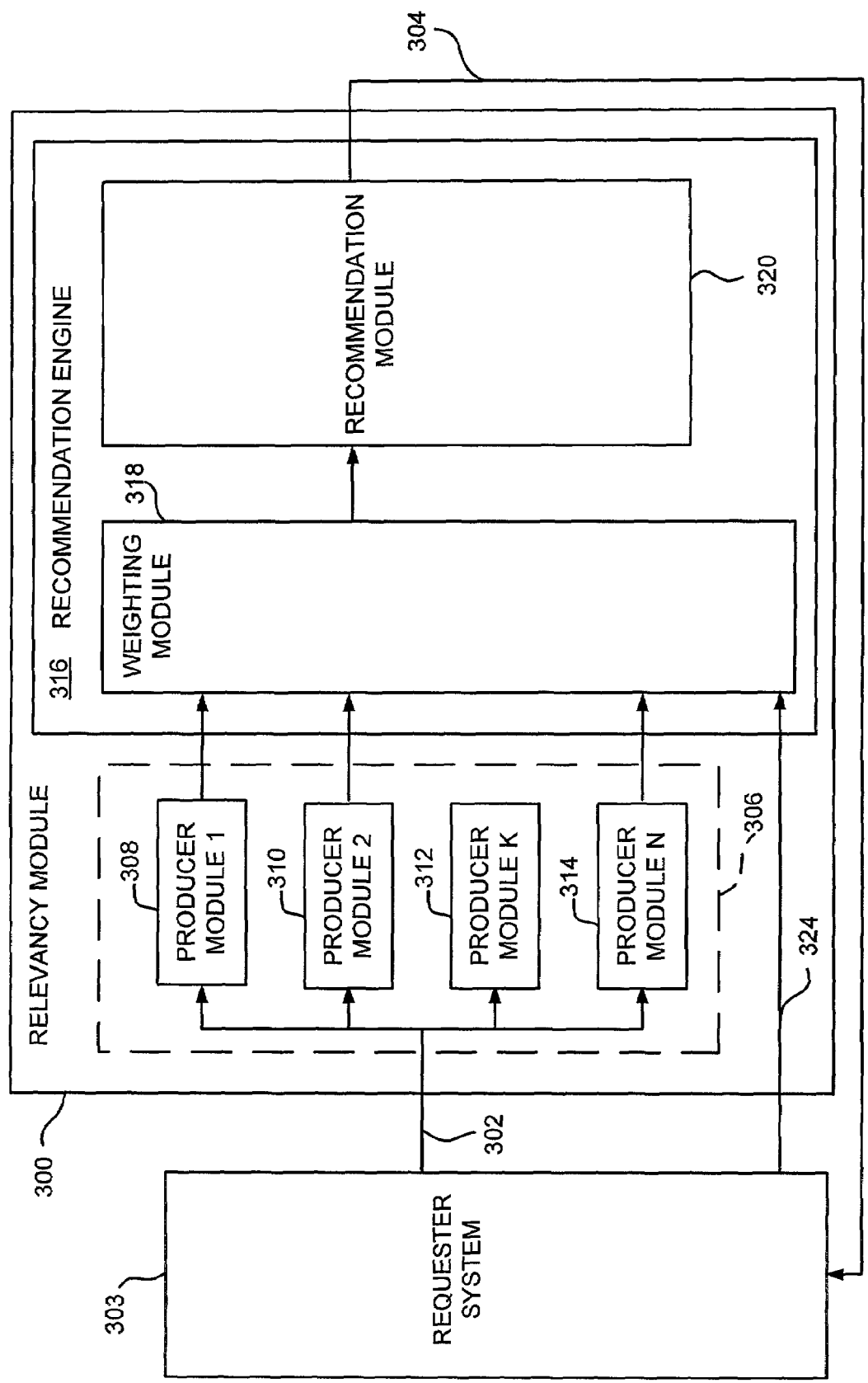
FIG. 3 is a block diagram illustrating various modules employed in a relevancy module in accordance with an embodiment of the present invention.

Turning now to FIG. 3, an embodiment of the present invention is shown having a relevancy module 300, which receives one or more requests 302 from a requester system 303 and which delivers, in response, one or more initial recommendations 304 back to the requester system 302. In general, and as described in detail below, the relevancy module 300 receives a request(s) from the requestor system 303 and conveys that request to one or more producer modules 306. Each of the producer modules that receive the request then uses the information contained in the request to select or produce initial recommendation(s) from a group or set of recommendations that are associated with, or accessible to, the producer. The initial recommendations produced by each of the producer modules in response to the request are then sent to a recommendation engine 316, which processes the initial recommendations to produce a list of survived recommendations and conveys that list of survived recommendations back to the requestor system 303.

Turning now to the detail of the system shown in FIG. 3, in operation of the relevancy module 300, a requester system 303 initially sends a request(s) 302 to the relevancy module 300. As used herein, a requester system 303 may be anything that is operable to communicate requests 302 to the relevancy module 300. Upon receiving the request 302, the relevancy module 300 sends the request, or a request based on, extracted from, or containing that request 302, on to one or more producer modules 306. Alternatively, the requests may be received directly from the requestor system by the producer modules.

With respect to this embodiment of the present invention, a request 302 is an informational unit containing data that is used by the relevancy module and/or the producer modules in producing a recommendation(s). For example, a request may contain information about the requestor system, the amount or type of recommendations desired, or any other information that will enable the relevancy module to produce recommendation(s) that are relevant to the request.

Upon receiving a request, each applicable producer module that receives the request then uses the information contained in the request to compute and generate initial recommendation(s) from a group or set of recommendations that are associated with, or accessible to, the producer module 106. With respect to this embodiment, each recommendation preferably includes, without limitation, an object or an object identifier and a producer identifier that indicates or specifies the producer that produced the initial recommendation. As used herein, the term "object" includes any item, group of items, entity, or entities that can be delivered by any means to a requester system, such as requester system 303, or to the user of a requester system 303. For example, with respect to objects that may be delivered over a computer network, objects may be, without limitation, web pages, programs or applications, applets, SKU items, advertisements or promotions, sounds or sound files, various images, web page templates, database tables, SQL queries, etc. An object identifier may be any symbol, number, or the like, that identifies a particular object.

As shown in FIG. 3, not every producer module 306 necessarily selects or generates an initial recommendation(s) for delivery to the recommendation engine 316. For example, producer module K 312 is shown in FIG. 3 as not selecting an initial recommendation(s). There are a number of reasons why a particular producer would not select an initial recommendation(s). For example, a particular producer module may not select an initial recommendation(s) if the request 302 received by the producer module is not relevant to that particular producer module. A producer module may not select an initial recommendation(s) because it has been "turned off" or disabled for a given request or a specific type of request. A producer module may be "turned off" or disabled for a given period of time for any number of reasons relating to the operation of the relevancy module 300. Additionally, a particular producer module may not receive a request 302, thus the producer module would be unable to select an initial recommendation(s).

After the producer modules have selected initial recommendation(s), these initial recommendations are then sent to the recommendation engine 316 which, in turn, processes the initial recommendations to produce a list of survived recommendations that is sent back to the requestor system 303.

In one embodiment, the recommendation engine 316 includes a weighting module 318 and a recommendation module 320, which are used by the recommendation module 320 in selecting survived recommendations for the requestor system 303. In this embodiment, the weighting module 318 receives the initial recommendation(s) from the producer modules and applies some weight or prioritization to each of the initial recommendations, based on feedback from the requester system 303. Once weighted, the weighting module 318 conveys the weighted request(s) to the recommendation module 320.

In one embodiment, the weighting module 318 adjusts the weight of each of the initial recommendations based one or more inputs 324 from the requester 303. For example, the weighting module 318 may receive inputs 324 indicating the success of the producer module 1 308 in producing effective recommendations. The initial recommendations produced by producer module 1 308 may then be adjusted based on the success of producer module 1 308 in producing effective recommendations relative to the success of the other producer modules in producing effective recommendations. As will be understood by one skilled in the art, the effectiveness of a given recommendation may be determined in a number of ways. For example, the effectiveness of a given recommendation may be determined based on a positive reaction by a user of the requester system 303 to a given survived recommendation. As another example, the weighting module 318 may receive inputs 302 requiring the initial recommendation from one of the producer modules to be weighted higher than the initial recommendation of the other producer modules.

As shown in FIG. 3, the recommendation module 320 receives the initial recommendations produced by the producer modules 306, adjusted if applicable by the weighting module 318, and produces a list of survived recommendations 304 for delivery to the requestor system 303. The number of survived recommendations 304 produced by the recommendation module 320 may be fixed or it may be dynamic. For example, the recommendation module 320 may be set to produce a predetermined maximum number of survived recommendations 304. As another example, the recommendation module 320 may produce a survived recommendation for each initial recommendation produced by the producer modules 306. Furthermore, the number of survived recommendations produced by the recommendation module 320 might be a function of any number of different algorithms. One example of such an algorithm would be an algorithm that selects the number of survived recommendations based on factors such as, without limitation, the particular hardware and/or software characteristics of the relevancy module and requester system, or the capabilities of the communication path between the relevancy module and the requester system. For example, the number of survived recommendations may be based on the availability of the bandwidth of the various systems, the size of a screen used to view the recommendations delivered to the requestor system, and so forth.

Figure 4:
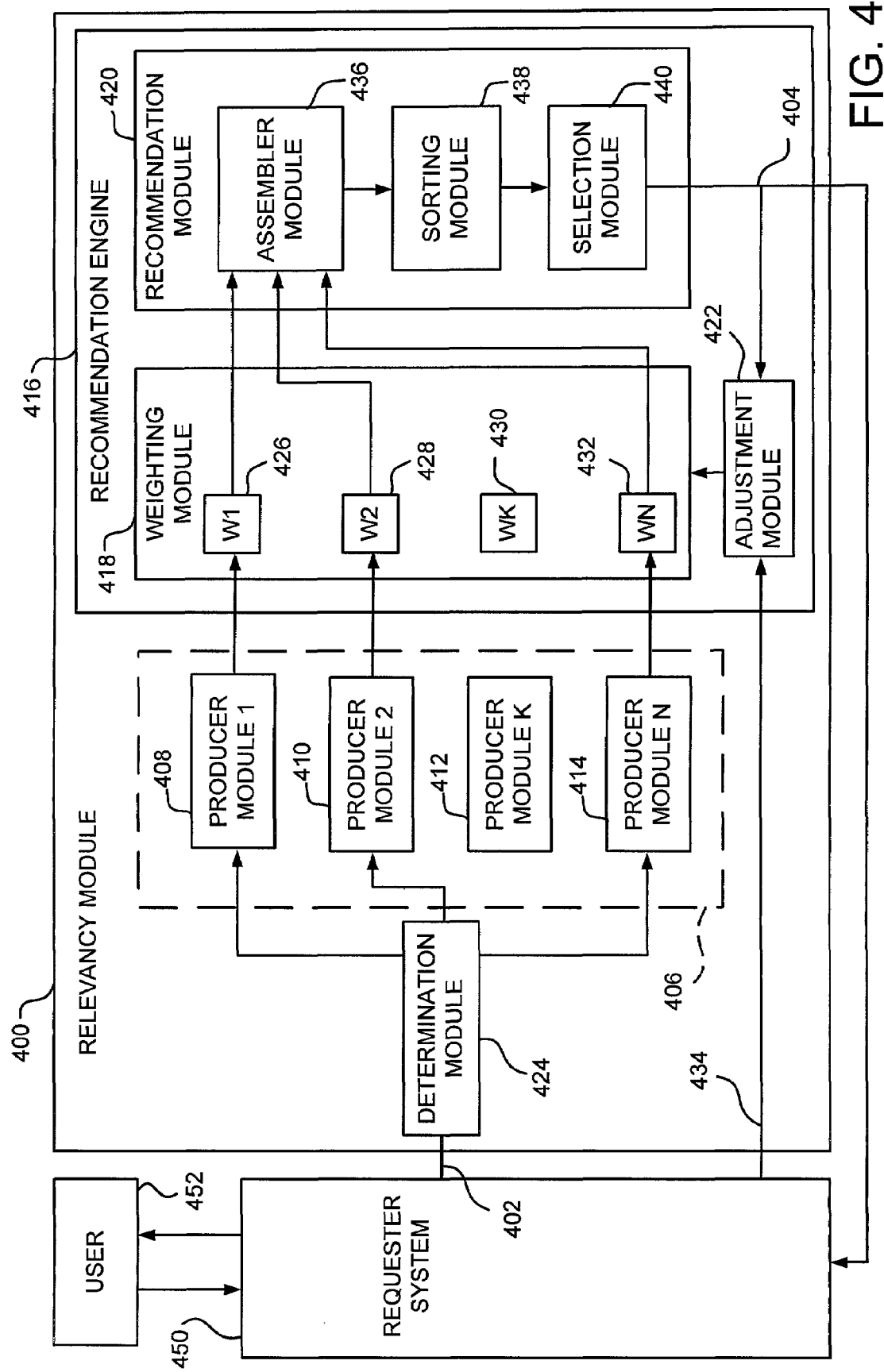
FIG. 4 is a block diagram illustrating various modules employed in a relevancy module in accordance with another embodiment of the present invention.

Another embodiment of the present invention is shown in FIG. 4. This embodiment of the present invention includes a relevancy module 400, which receives a request 402 from a requester system 450, and which returns back to the requester system 450, in response to the request 402, a list of survived recommendations 404. When used in connection with the Internet 106 (FIG. 1), the relevancy module 400 may be resident on or performed by a server computer system, such as server computer system 104, that is operable to communicate with a requester system 450, such as client computer system 102. For instance, the requester system 450 might be a web server hosting one or more websites, as is known in the art, having one or more users 452 accessing web pages on the requester system 450. In such a case, a request 402 might be made with respect to a user's 452 interaction with a particular website hosted on the requester system 450. Based on the user's interaction, the requester system 450 sends a request for recommendations to the relevancy module 400 running on the server computer system 104. For example, the user 452 might click a hyperlink on a web page hosted on the requester system 450, and, in turn, the requester system 450 would send a request to the relevancy module 400 for recommendations that are relevant to the hyperlink clicked by the user. Upon receiving the request, the relevancy module 400 would then select a number of recommendations, as described in greater detail below, and transmit the selected survived recommendations to the requester system 450.

In this embodiment, each of the recommendations in a list of survived recommendations produced by the relevancy module 400 preferably includes, without limitation, an object pair and a producer identifier that indicates the specific producer that produced the recommendation. If more than one producer module produced a specific recommendation, a producer identifier for each producer module that produced the recommendation may be included in the recommendation. As used herein, the term "object pair" describes an informational set of values produced by a producer module that includes an object identifier indicative of a particular object and a confidence level indicative of the degree of trust or assurance that the particular object satisfies some established criteria. As will be understood to those of ordinary skill in the art, many methods or algorithms for determining or computing object confidence levels exist and typically these methods vary according to the particular producer module employed. Indeed, embodiments of the present invention may employ various commercially available producer modules and/or any number of proprietary producer modules to produce recommendations. A comprehensive description of the different methods of determining confidence levels employed in the various producer modules is well known to those skilled in the art and is not necessary to understand and implement the present invention. Accordingly, additional details concerning the determination or computation of confidence levels by the various producer modules are not disclosed.

In addition to the object pair and the producer identifier(s), a recommendation may include information related to the requester system, the initial request, the object recommended, or any other information useful or necessary to the operation the relevancy module 400. For example, and without limitation, a recommendation may include one or more of the following: a request identifier that identifies the initial request sent to the producer modules that produced the recommendation; a session identifier that identifies the particular session on the requestor system that motivated the initial request; a recommendation identifier that indicates the list of recommendation of which the recommendation is a part; a URL key that identifies a specific URL being recommended; an item identifier that identifies a particular item on a web page; a title of a specific web page being recommended; a summary of a specific web page being recommended; and/or an image or an identifier of a specific image. As noted below, a request identifier is preferably not a cookie.

As stated above, in operation, the requester system 450 initially sends a request 402 for relevant recommendations to the relevancy module 400. The request for relevant recommendations includes information that allows the relevancy module 400 to produce relevant recommendations for delivery to the requester system 402. For example, and without limitation, in one embodiment the request 402 may include the following: a requester agent (an identifier that indicates the type of device the user is employing); a Uri key (a standard universal resource identifier, for example url:/products/books?isdn=10001); a Site ID (a key that identifies a website, such as www.amazon.com); a Track ID (a tracking identification attribute such as sessionID, userId, etc); Constraints (operational limitations); RecCount (the number of recommendations to be returned to the requester); and Hints (processing hints for the engine). For example, a request may comprise: ("messageID" ("T3af87b37SdR38251100"); "recCount" ("3"); "siteID" ("www.acompany.com"); "uriKey" ("url:www.acompany.com/what/index.htm"); and TrackingID ("Teea332f1")).

As shown in FIG. 4, the relevancy module 400 includes a determination module 424, a number of producer modules 406, and a recommendation engine 416 The producer modules are put in communication with the relevancy module using a producer module registration operation, as described in greater detail below. The determination module 424 receives a request 402, determines an appropriate producer module or modules 406 for the received request, and transmits the received request to appropriate producer module(s) 406.

There are two ways to determine the appropriate producer module or modules for a given request, explicitly and/or implicitly. To explicitly determine a producer module for a given request, requester system 450 may specify, such as in the request itself, which of the producer modules the requester wants used or, conversely, not used. For example, a requester 450 may send a request to the determination module not to use a content producer. To determine a producer module implicitly, the determination module will be configured with "trigger attributes" and/or "non-trigger attributes" associated with one or more producer modules. These "trigger attributes" and "non-trigger attributes" indicate specific elements within a request. For example, the determination module may include a "trigger attribute" associated with producer module 1 408 that indicates that if a request contains a particular siteID, that request should be sent to module 1 408. Similarly, the determination module may include "non-trigger attribute" associated with producer module 1 that indicates that if a request contains a particular userID, that request should not be sent to module 1.

In an alternate embodiment of the present invention, the relevancy module 400 does not include the determination module 424. As such, in this alternative embodiment, each of the producer modules 406 receives the request 402 from the requester system 450 directly without the requests first being handled by the determination module.

As used herein, the term "producer module" describes a software module that is operable to receive one or more requests for recommendations and that delivers as an output a list of initial recommendations, where a list of initial recommendations may include a single recommendation, a plurality of recommendations, or no recommendations. A producer module may be any of a number of commercially available producer modules and/or any number of proprietary producer modules. Producer modules may determine or select recommendations based on a number of different criteria or methodologies including, without limitation, content relevancy, stateful path prediction, path analysis, popular item, popular URL, item-oriented collaborative transaction filtering, collaborative URL filtering, group collaborative transaction filtering, grouped popular items, grouped popular URLs, user-oriented collaborative transaction filtering, and other producer modules that are presently known producer or producer modules that may be developed hereafter. The invention is not limited by the number and nature of such producer modules.

As shown in FIG. 4, each of the producer modules 406 is operably connected to the determination module and operable to receive requests from the determination module 424 or, alternatively, directly from the requester system 450. Each of the producer modules 406 is operable to produce a list of initial recommendations in response to the receipt of a request 402 for relevant recommendations. In the case where the requester system 450 is a web server hosting one or more websites, each individual website hosted by the requester system 450 may be associated with a separate relevancy module 400. For example, a website directed to the sale of books might be associated with one relevancy module while a website directed to providing research information might be associated with another relevancy module. In such a case, each relevancy module 400 would preferably include one or more producer modules 406 particularly suited to the subject matter of the website. Alternatively, one or more relevancy modules may share a producer module or modules. In such a case, the producer module would preferably have different settings, such as different weights for different sites. The relevancy module 400 may include any number of producer modules 406. However, for simplicity, only four producer modules: producer module 1 408; producer module 2 410; producer module K 412; and producer module N 424 are shown, where producer module N 412 indicates or signifies that an integer number N of producer modules may be included in the relevancy module 400. Additionally, a single relevancy module 400 may handle multiple sites.

The manner in which the various producer modules 406 select initial recommendations may vary from producer module to producer module. However, each of the producer modules will preferably be operable to produce a list of initial recommendations in response to a request for relevant recommendations. The producer modules may each include, or be associated with, a repository of recommendations, such as a database of recommendations, from which relevant recommendations are selected. Alternatively, one or more of the producer modules may be associated with a single repository of recommendations from which relevant recommendations are selected. A detailed description of the particular algorithms used by or employed in the various producer modules to select relevant recommendations is well known to those skilled in the art and is not necessary to understand or implement the present invention. Accordingly, additional details concerning the particular algorithms used by or employed in the various producer modules are not disclosed.

As shown in FIG. 4, not every producer module 406 necessarily produces a list of initial recommendations. Additionally, while a producer module may produce a list of initial recommendations, that list may not include any recommendations. That is, the producer may produce an empty list of initial recommendations. For example, producer module K 412 is shown in FIG. 4 as not producing a list of initial recommendations. There are a number of reasons why a particular producer 406 would not produce a list of initial recommendations or may produce an empty list of initial recommendations. For example, a particular producer 406 module may not receive a request 402 from the determination module 424. A particular producer 406 module may not be able to locate, determine, or produce a recommendation that is appropriate to a given request 402. Additionally, a producer module may be "turned off" or disabled for a given request or a specific type of request. A producer module may also be "turned off" or disabled for a given period of time for any number of reasons relating to the operation of the relevancy module 400. Producer modules 406 may be added to the relevancy module 400 using a registration process, as described in greater detail below with respect to FIG. 6.

The recommendation engine 416 includes a weighting module 418, a recommendation module 420, and an adjustment module 422. The weighting module 418 functions to adjust the confidence levels of the recommendations in n initial a list(s) of recommendations produced by the producer modules 406. The weighting module 418 includes a number of weighting values. For example, as shown in FIG. 4, the weighting module 418 includes: weighting value W1 426; weighting value W2 428; weighting value WK 430; and weighting value WN 432, where weighting value WN 432 indicates that an integer number N of weighting values may be included in the weighting module 418. Each of the weighting values 426, 428, 430, and 432 is preferably associated with a corresponding producer module 408, 410, 412, and 414, respectively. Each of the weighting values 426, 428, 430, and 432 is utilized in adjusting the weight of the confidence levels of recommendations in an initial list of recommendations produced by its associated producer module. As described in greater detail below, the adjustment module 422 interacts with the weighting module 418 to adjust the weighting values based on, among other things, the success of the producer modules 406 in producing effective recommendations 404. Additionally, each of the producer modules 406 is preferably assigned a particular weighting value when the producer is registered with the relevancy module 400, as described in detail below.

In this embodiment of the present invention, the recommendation module 420 includes an assembler module 436, a sorting module 438, and a selection module 440. As shown in FIG. 4, the assembler module 436 receives the initial list or lists of recommendations produced by the producer modules 406. The assembler module then assembles all of the initial lists of recommendations into a single combined list of recommendations. After assembly of the lists of recommendations into a single combined list of recommendations, the sorting module 438 sorts the combined list of recommendations, according to a predetermined sorting algorithm or routine, to produce a sorted list of recommendations. The sorting algorithm being applied to the combined list of recommendations compares the confidence levels of the recommendations and orders the combined list of recommendations according to the confidence levels of the recommendations to create a new list of sorted recommendations. For example, the list of sorted recommendations may be ordered in descending order starting with the recommendation having the highest confidence level and ending with the recommendation having the lowest confidence level. As is well known in the art, any number of different sorting algorithms may be used to sort a list in this manner.

After the list of sorted recommendations has been created by the sorting module 438, the selection module 440 selects one or more of the recommendations from the list of sorted recommendations and the selected one or more of the recommendations are transmitted 404 to the requester system 450 as survived recommendations. A number of different methods or algorithms may be used by the selection module to select survived recommendations. Additionally, the number of survived recommendations selected for transmission to the requester may either be fixed or variable depending on the methods or algorithms used to select the survived recommendations. For example, the selection module 440 may select a first group of a predetermined number N of recommendations having the highest confidence levels. The recommendations 404 based on the selected one or more of the recommendations are then transmitted 404 to the requester system 450 as survived recommendations. As another example, the selection module 440 may first select a first group of a predetermined number N of recommendations having the highest confidence levels and then randomly select from this first group a second group of a predetermined number M of recommendations. Recommendations 404 from the second group of a predetermined number M of recommendations are then transmitted 404 to the requester system 450 as survived recommendations. As yet another example, the selection module 440 may first select a group of a predetermined number N of recommendations having the highest confidence levels and then select from the first group a predetermined number M recommendations for transmission to the requester system 450 as survived recommendations, wherein the likelihood of any one recommendations in the first group being selected as a recommendation in the second group is related to the confidence level of that one recommendations. Recommendations 404 in the second group of a predetermined number M of recommendations are then transmitted 404 to the requester system 450 as survived recommendations. For example, a recommendation in the first group having a confidence level of 0.34 might have a 34% likelihood of being selected from the first group for inclusion in the second group. The foregoing examples of the operation of the selection module 440 have been presented for the purposes of illustration and are not intended to be exhaustive or to limit the invention, and, in particular, the operation of the selection module 440 to the precise examples described.

As mentioned above, the adjustment module 422 interacts with the weighting module 418 to adjust the weighting values in the weighting module 418 based on the success of the various producer modules 406 in producing effective recommendations. As described below, there are a number of possible ways to determine the effectiveness of a recommendation 404. For example, the effectiveness of a given recommendation may be related to, or arrived at by examination of, a user's interaction with a requester, such as a user's actions on a website. As is known in the art, there are a number of ways to track a user's actions on a website. For example, and without limitation, information may be collected about a user indirectly through standard Web logs or by additional web server extensions. Web logs may include the date and time a request from a user to a web server was received, the IP address that originated the request, the URL of the HTML page, graphic elements or executable scripts requested, a result code, the domain name from which the request originated, and an identifier for the user agent (typically a browser) that requested the page. Additionally, the log file may include a referrer field, which indicates the previous page requested by a given user agent. Furthermore, the log file may provide information on cookies that have been previously sent to a user by a web server. Cookies provide a record of the user's activity on the website. However, in a preferred implementation of the present invention, cookies would not be used, and the data related to the user's actions would be processed at run-time. In this way, all of the behavior analysis will be timely and, therefore, enable the system to produce an adaptive set of recommendations that meet a user's intent in the context of his or her interaction in real-time. Additionally, by not using cookies, a user's privacy may be maintained.

Figure 5:
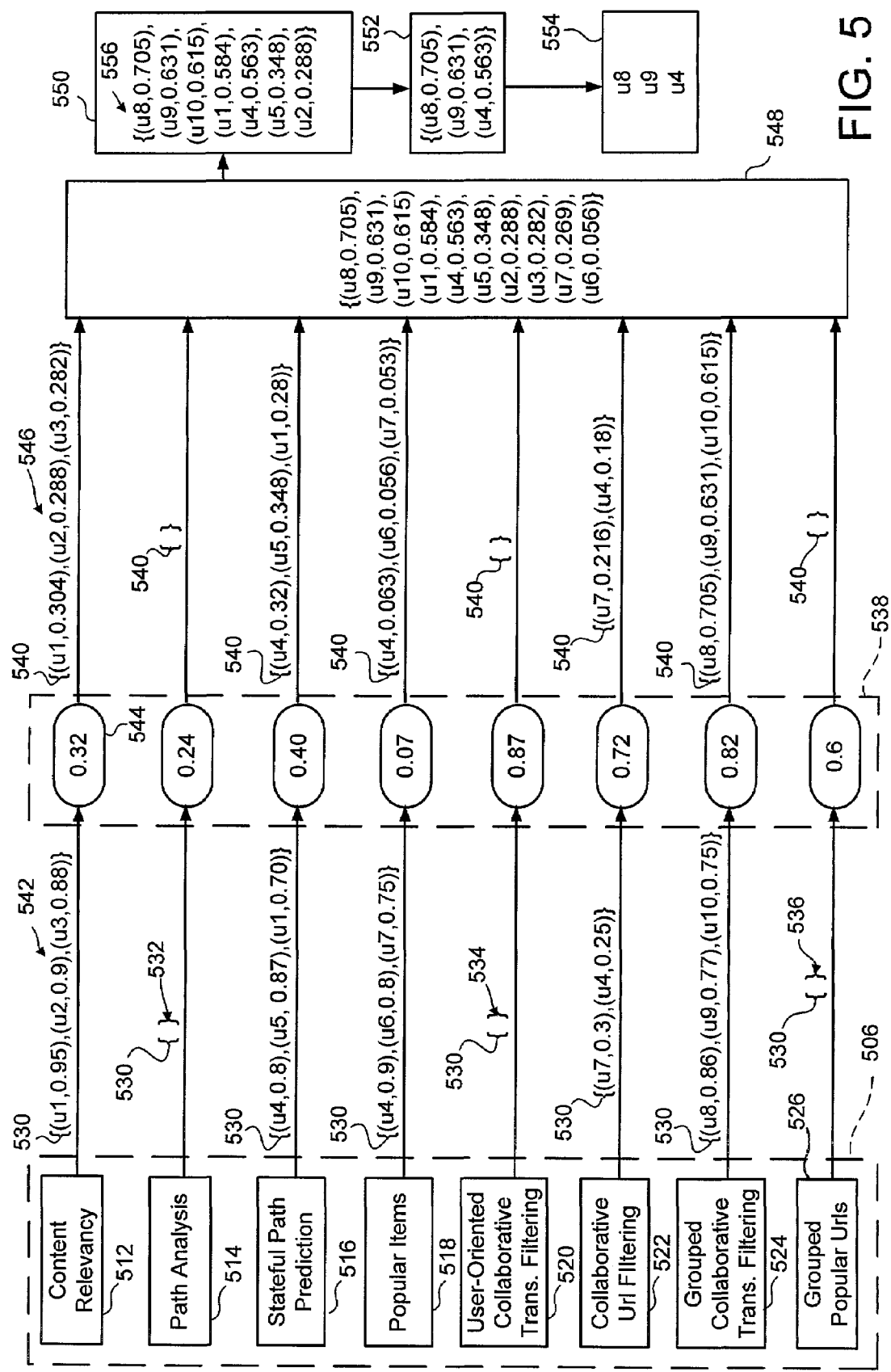
FIG. 5 illustrates an exemplary operational flow illustrating operations employed in the relevancy module shown in FIG. 4.

An additional understanding of the functioning of the relevancy module 400 may be had by reference to FIG. 5. FIG. 5 illustrates one specific example of the operation of the relevancy module 400 (FIG. 4). The specific example shown in FIG. 5 is not intended to comprehensively or exclusively lay out the operational flow of the relevancy module 400. Rather, the specific example shown in FIG. 5 is intended to give an overview of one possible manner of implementing the relevancy module 400.

For simplicity, with respect to the example shown in FIG. 5, all recommendations are shown as including only object pairs. It is to be understood that each of the recommendations also includes a producer identifier(s), and may include, as described above, other information as related to the requester system, the initial request, the object recommended, or any other information useful or necessary to the operation the relevancy module 400. For example, and without limitation, a recommendation may include one or more of the following: a request identifier that identifies the initial request sent to the producer modules that produced the recommendation; a session identifier that identifies the particular session on the requestor system that motivated the initial request; a recommendation identifier that indicates the list of recommendation of which the recommendation is a part; a URL key that identifies a specific URL being recommended; at item identifier that identifies a particular item on a web page; a title of a specific web page being recommended; a summary of a specific web page being recommended; and/or an image or an identifier of a specific image.

The operational flow of the relevancy module 400, shown in FIG. 5, begins after a request for relevant recommendations has been received by the relevancy module 400 and transmitted to a number of producer modules 506 including: a content relevancy module 512, a path analysis module 514, a stateful path prediction module 516, a popular item module 518, a user-oriented collaborative transaction filtering module 520, a collaborative URL filtering module 522, a group collaborative transaction filtering module 524, and a grouped popular URLs module 526. In this example, the determination module is not included, or not used, in the relevancy module 400. Rather, the request for relevant recommendations is sent to each of the producer modules 506. The request may include, without limitation, a trackingID, a siteID, a UriKey, constraints, and hints. In this example, the request includes, among other things, the number of relevant recommendations desired.

In response to the request for relevant recommendations, each of the producer modules 506 produces a list 530 of initial recommendations. As shown in FIG. 5, the first element of each of the object pairs in a recommendation is an object identifier (e.g. u1) and the second element of each of the object pairs in a recommendation is the confidence level (e.g. 0.95). For example, as shown in FIG. 5, the content relevancy module 512 produced the list of initial recommendations {(u1, 0.95), (u2, 0.9), (u3, 0.88)}; the stateful path prediction module 516 produced the list of initial recommendations {(u4,0.8), (u5, 0.87), (u1,0.70)}; the popular items module 518 produced the list of initial recommendations {(u4,0.9), (u6,0.8), (u7,0.75)}; the collaborative URL filtering module 522 produced the list of initial recommendations {(u7,0.3), (u4,0.25)}; and the group collaborative transaction filtering module 524 produced the list of initial recommendations {(u8,0.86), (u9,0.77), (u10, 0.75)}.

As shown in FIG. 5, some of the producer modules produced lists of initial recommendations containing one or more of the same object identifiers. For example, both the stateful path prediction module 516 and the popular items module produced lists of initial recommendations containing the object identifier u4. Additionally, as shown in FIG. 5, three of the producers 514, 520, and 526 have produced empty lists of initial recommendations 532, 534, and 536, respectively. As described above, the producer modules 514, 520, and 526 may have produced empty lists of initial recommendations for a number of reasons. For example, the producer modules 514, 520, and 526 may not have been able to locate, determine, or produce a recommendation that is appropriate for the received request.

After the lists 530 of initial recommendations have been produced by the producer modules 506, each of the lists 530 is modified by the weighting module 418. As shown in FIG. 5 and in Table 1 below, in this example the weighting module 418 modifies the lists 526 by multiplying each of the confidence levels in a list by the weighting value 538 associated with the producer module that produced the list.

For example, as shown in FIG. 5 and Table 1, each of the confidence levels in the list of initial recommendations 542 produced by the content relevancy module 512 is multiplied by the weighting value 544 0.32 associated with the content relevancy module 512 to produce a modified list of recommendations 546.

TABLE 1

| Producer Module Type | List of Recommendations | Weighting Value | Modified List of Recommendations |
| --- | --- | --- | --- |
| Content Relevancy | {(u1, 0.95), (u2, 0.9), (u3, 0.88)} | 0.32 | {(u1, 0.304), (u2, 0.288), (u3, 0.282)} |
| Path Analysis | { } | 0.24 | { } |
| Stateful Path Prediction | {(u4, 0.8), (u5, 0.87), (u1, 0.70)} | 0.40 | {(u4, 0.32), (u5, 0.348), (u1, 0.28)} |
| Popular Items | {(u4, 0.9), (u6, 0.8), (u7, 0.75} | 0.07 | {(u4, 0.063), (u6, 0.056), (u7, 0.0525)} |
| User-Oriented Collaborative Filtering | { } | 0.87 | { } |
| Collaborative URL Filtering | {(u7, 0.3), (u4, 0.25)} | 0.72 | {(u7, 0.216), (u4, 0.18)} |
| Grouped Collaborative Transaction Filtering | {(u8, 0.86), (u9, 0.77), (u10, 0.75)} | 0.82 | {(u8, 0.705), (u9, 0.631), (u10, 0.615)} |
| Grouped Popular URLs | { } | 0.6 | { } |

Next, the modified lists of recommendations 540 are assembled into a single combined list of recommendations (not shown) and sorted to produce a sorted list of recommendations 548. As shown in FIG. 5, the assembly of the combined list may include the step of combining the confidence levels of recommendations having identical object identifiers. For example, as shown in FIG. 5, both the content relevancy module 512 and the stateful path prediction module have produced recommendations having recommendations including u1 as the object identifier. In this example the two recommendations having u1 object identifiers are combined in the combined list of recommendations into a single recommendation having a confidence level of 0.584, which is the sum of the confidence levels of the recommendations. Alternatively, other algorithms may be used to provide an overall confidence value for recommendations appearing in more than one list.

The selection of survived recommendations to satisfy the request 402 is next made from the sorted list of recommendations 548. While the selection of survived recommendations to satisfy the request 402 may be made directly from the sorted list of recommendations 548, in this example, the selection of survived recommendations occurs in two steps to allow for a degree of randomness in the selection process. By providing a degree of randomness in the selection of survived recommendations, a greater variety of survived recommendations will be sent to a requester system. This type of randomness is particularly useful, for example, in situations where a requester system 450 wishes to provide users 452 who make repeated visits to the same web pages a non-static web page environment.

In the first step of this two step recommendation selection process, a number N of recommendations having the highest confidence levels are first chosen from the sorted list of recommendations 548 according to the following equation: $N=2*i+1$, where i is the number of recommendations desired as specified in the request 202 and N is the number of recommendations to be chosen. In this example i=3 and the resulting list of selected recommendations 550 comprises: {(u8, 0.705), (u9, 0.631), (u10, 0.615), (u1, 0.584), (u4, 0.563), (u5, 0.348), (u2, 0.288)}.

Next, a number M of survived recommendations 552 is selected from the chosen list of N recommendations 550. In this example, M equals i, which equals 3. The recommendations selected from the group of N recommendations are selected according to a selection algorithm that selects recommendations based on the confidence levels of the recommendations. For instance, in this example, the likelihood of the recommendations 556 in the list of M selected survived recommendations 552 being selected is approximately 70.5%.

As shown in FIG. 5, the list of M selected survived recommendations 552 comprises {(u8, 0.705), (u9, 0.631), (u4, 0.563)}. The list of M selected survived recommendations 552, or various elements of the M selected survived recommendations 552, may then be sent to the requester 250. For example, the object identifiers 554 of M selected recommendations 552 from the recommendations of the M selected recommendations 552 could be sent to the requester 250 along with the producer identifier for the producer(s) that selected the M selected. Alternatively, the objects identified by the object identifiers 554 of M selected survived recommendations 552 could be sent to the requester 250 along with the producer identifier for the producer(s) that selected the M survived recommendations.

As mentioned above, the adjustment module 422 interacts with the weighting module 418 to adjust the weighting values in the weighting module 418 based on the success of the various producer modules 406 in producing effective recommendations. In one embodiment, the weighting module adjusts the weighting values in the weighting module 418 as follows. For a given time period $\Delta t$, each producer module 506 will have an associated list of survived recommendations $SRL_k = \{SR_{k1}, SR_{k2}, \ldots SR_{kn}\}$, where $SR_{k1}$ is the first survived recommendation object produced by producer module k during time period $\Delta t$, where $SR_{k2}$ is the second survived recommendation object produced by producer module k during time period $\Delta t$, and so on up to $SR_{kn}$, which is the last survived recommendation object produced by producer module k during time period $\Delta t$. As used herein, a survived recommendation SR is a recommendation that has been produced by a producer module and selected by the selection module 240. For example, after a given time $\Delta t$, producer module 1 208 will have an associated list of survived recommendations $SRL_1 = \{SR_{11}, SR_{12}, \ldots SR_{1n}\}$.

In addition to the associated set of survived recommendations 204, for a given time $\Delta t$, each producer module 406 will have an associated user reaction list $URL_k = (UR_{k1}, UR_{k2}, \ldots UR_{kn})$, where $UR_{k1}$ is a user reaction value indicative of a user's reaction to the survived recommendation identified by $SR_{k1}$, $UR_{k2}$ is a user reaction value indicative of a user's reaction to the survived recommendation identified by $SR_{k2}$, and so in up to $UR_{kn}$, which is a user reaction value indicative of a user's reaction to the survived recommendation identified by $SR_{kn}$.

For a given time period $\Delta t$, each producer module 506 will have an associated list of survived recommendations SRL and an associated user reaction list URL. A user reaction value U=F(URL) may then be calculated for each producer module for time period $\Delta t$. For example, a user reaction may be calculated according to the following formula: $U_k = \text{SUM}(UR_m)$, $n >= m >= 0$.

A user reaction value $UR_k$ may be measured in a number of different manners. For example, and without limitation, a user reaction value may be determined as a function of positive user reactions $P_k(SR_k)$ and/or negative user reactions $N_k(SR_k)$, such as $UR_k = P(SR_k) - N(SR_k)$ to an object associated with a survived recommendation. In this example, with respect to positive user reactions, $SR_k$ may be relate to, for example and without limitation, the user clicking on an object associated with a survived recommendation, user time spent on an object associated with a survived recommendation, user transactions related to an object associated with a survived recommendation, explicit positive user feedback with respect to an object associated with a survived recommendation, and so on. In this example, with respect to negative user reactions, $S_{Pk}$ may be related to, for example and without limitation, a user closing an object associated with a survived recommendation, explicit negative user feedback with respect to an object associated with a survived recommendation, and so on. The numeric form of $SR_k$ may vary. For example, $SR_k$ may be in the form of a decimal number or in the form of an integer. Each producer module 506 will have an associated list of user reaction values $UL_k = (U_{k1}, U_{k2}, \ldots, U_{kn})$, where $U_{k1}$ is the first user reaction value associated with producer module k, $U_{k2}$ is the second user reaction value associated with producer module k, and so in up to $U_{kn}$, which is the last user reaction value associated with producer module k. Put simply, $UL_k$ is a list of user reaction that have been associated with a given producer since that given producer has been "live."

Each producer module 506 will have an associated list of weighting values $WL_k = (W_{k1}, W_{k2}, \ldots, W_{kn})$, where $W_{k1}$ is the first weighting value associated with producer module k, $W_{k2}$ is the second weighting value associated with producer module k, and so in up to $W_{kn}$, which is the last weighting value associated with producer module k. Put simply, $WL_k$ is a list of weights that have been associated with a given producer since that given producer has been "live."

The adjustment module will have an associated user reaction history $UL = (UL_1, UL_2, \ldots, UL_N)$, where $UL_1$ is the user reaction history associated with producer module 1, $UL_2$ is the user reaction history associated with producer module 2 and so on up to $UL_N$, which is the user reaction history associated with producer module N.

The Relevancy Module has an overall associated weighting history $WL = (WL_1, WL_2, \ldots, WL_N)$, where $WL_1$ is the weight history of producer module 1, $WL_2$ is for producer module 2, and so forth.

Having determined $U_{kn}$, WL, $W_{kn}$, and UL, a new weighting value $W_{k(n+1)}$ associated with producer module k can be determined. For example, and without limitation, a new weighting value $W_{k(n+1)}$ may be determined according to the following formula: $W_{k(n+1)} = W_{kn} + (U_{kn} - \text{Avg})/\text{Avg}$, where Avg is the average user reaction to producers during time period $\Delta t$ divided by the total number of producers.

An additional understanding of the functioning of the adjustment module 222 may be had with reference to the following simplified example of the functioning of the adjustment module 422. The following example is exemplary only and is not intended to comprehensively and exclusively lay out the operational flow of the adjustment module 222. For ease of understanding, in this example, positive user reactions relate only to the user clicking on an object associated with a survived recommendation, while negative user reactions relate only to a user explicitly closing an object associated with a survived recommendation. Furthermore, positive user reaction are more simply calculated by summing all of the positive user reactions to objects associated with the survived recommendations during a given time period and dividing that sum by the total number of survived recommendations during the same time period. Negative user reactions are calculated in a similar manner. In this example, the relevancy module includes, or interacts with, two producer modules: Producer Module A and Producer Module B. Producer Module A and Producer Module B have the following weight history during time period $\Delta t$:

$$WL_A=(0.5, 0.6, 0.62)$$

$$WL_B=(0.5, 0.5, 0.46)$$

During the time period $\Delta t$, Producer A has produced 20,000 survived recommendations, while Producer B has produced 100,000 survived recommendations. During the time period $\Delta t$, users have clicked on 500 of 20,000 objects associated with the survived recommendations of Producer A and 200 of 10,000 objects associated with the survived recommendations of Producer B. Additionally, during the time period $\Delta t$, users have explicitly closed 60 of the objects associated with the survived recommendations of Producer A and 50 objects associated with the survived recommendation of Producer B. As such, with respect to Producer A, the overall user reaction during time period $\Delta t$ may be determined as follows:

$$\text{Sum}(P(SR_A))=500/20{,}000=0.025$$

$$\text{Sum}(N(SR_A))=60/20{,}000=0.003$$

$$U_A=\text{Sum}(UR_A)=\text{Sum}(P(SR_A))-\text{Sum}(N(SR_A))=0.025-0.003=0.022$$

It is important to note that the following two assumptions have been made with respect to this particular example:
1. The positive reaction is calculated:

$$P(SR)=1/\text{size of}(SRL) \text{ if user clicked on recommendation}$$

$$P(SR)=0; \text{ otherwise}$$

2. The negative reaction is calculated:

$$N(SR)=1/\text{size of}(SRL) \text{ if user closed the recommendation;}$$

$$N(SR)=0; \text{ Otherwise}$$

Additionally, a bit formula transformation was made during the preceding calculations.

Similarly, with respect to Producer B, the overall user reaction during time period $\Delta t$ may be determined as follows:

$$P(SR_B)=200/10{,}000=0.02$$

$$N(SR_B)=50/10{,}000=0.005$$

$$U_A=P(SR_k)-N(SR_k)=0.02-0.005=0.015$$

New weighting value $W_A$ and $W_B$ may then be determined to replace previous weighting values $W_{PA}$ and $W_{PB}$, respectively, as follows:

$$\text{Avg}=(0.022+0.015)/2=0.0185$$

$$W'_A=W_A+(U_A-\text{Avg})/\text{Avg}=0.62+(0.022-0.0185)/0.0185=0.81$$

$$W'_B=W_B+(U_B-\text{Avg})/\text{Avg}=0.46+(0.015-0.0185)/0.0185=0.27$$

Figure 6:
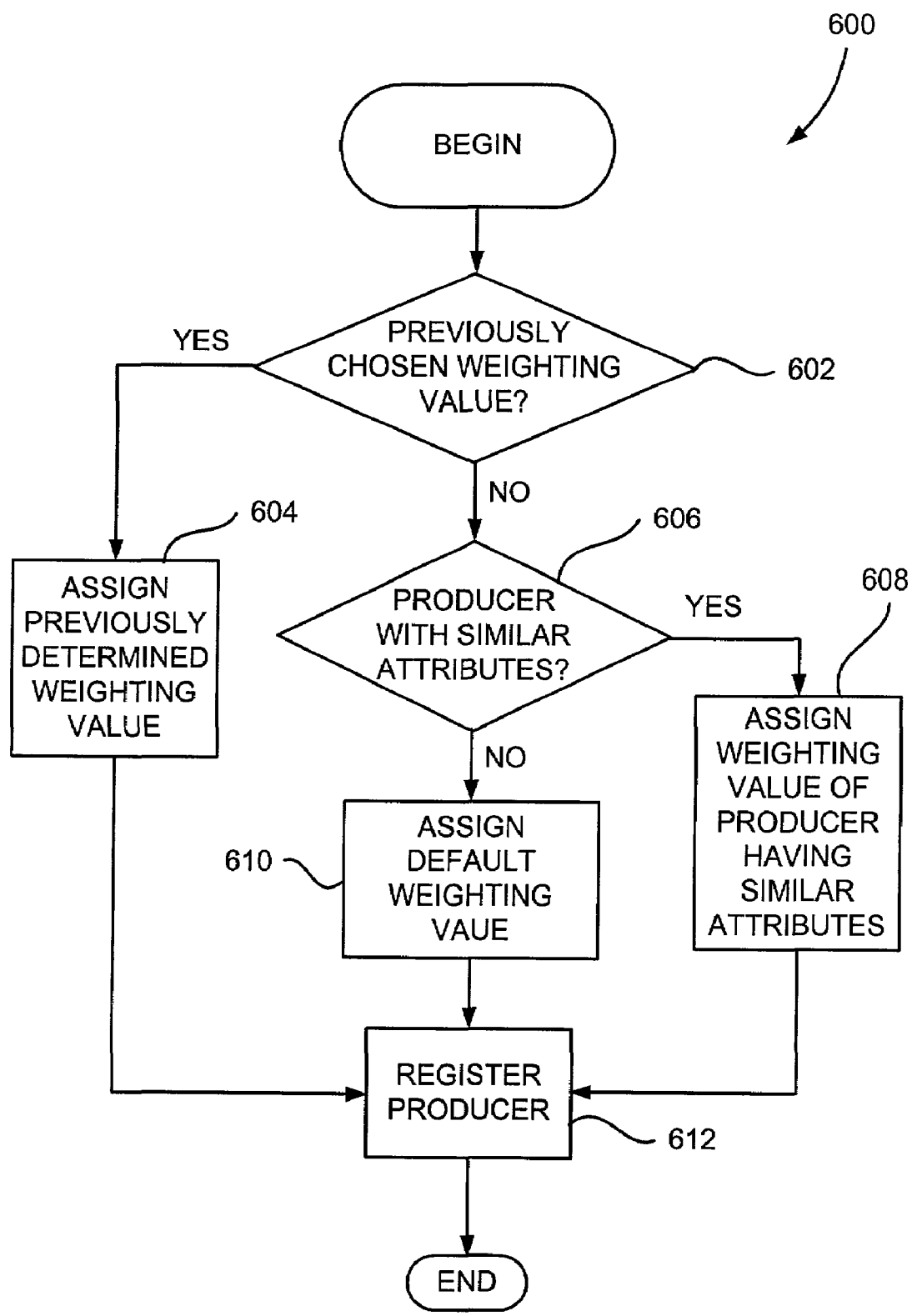
FIG. 6 illustrates an exemplary operational flow illustrating operations employed in the registration of a producer module in the relevancy module shown in FIG. 4.

FIG. 6 illustrates the operational flow of one example of a producer module registration process for the producer module 406 described above with respect to FIG. 4. At the start of the producer module registration process 600, a determination operation 602 determines whether a weighting value has previously been chosen for a producer module being registered. If the determination operation 602 determines that a weighting value has previously been chosen for the producer module being registered, an assignment operation 604 assigns the previously chosen weighting value to the producer module being registered. For example, in the process of initially configuring the relevancy module 400 for a particular requester system 450, initial weighing values may have been chosen for each of each producer modules to be included in the relevancy module 400. In such a case, each of the producer modules would be assigned its previously chosen weighting value by the assignment operation 604.

If the determination operation 602 determines that a weighting value has not previously been chosen for the producer module being registered, a determination operation 606 determines whether the producer has previously been assigned a weighting value to a similar website.

If the determination operation 602 determines that a weighting value has not previously been chosen for the producer module being registered, a determination operation 606 determines whether a producer module of the same type as the producer module being registered has previously been assigned a weighting value in its use in conjunction with a similar website. A similar website is either (1) a site that has similar contents and/or (2) a site that is intended for similar kind of user. For example, IBM's Intranet is similar to Microsoft's Intranet, Amazon.com is similar to barnsandnoble.com. If the determination operation 602 determines that a producer module of the same type as the producer module being registered has previously been assigned a weighting value in its use in conjunction with a similar website, this weighing value will be assigned to the producer module being registered by assignment operation 608.

If the determination operation 606 determines that a producer module of the same type as the producer module being registered has not previously been assigned a weighting value in its use in conjunction with a similar website, assignment operation 610 assigns a default weighting value to the producer module being registered. The default weighting value for a producer module being registered may be determined in a number of ways. For example, the default weighting value might be a function of the number of producer modules to be registered with a given relevancy module, such as weighting value=1/(number of producer modules to be registered to a relevancy module). As another example, each of the producer modules to be registered with a relevancy module may have acquired a performance ranking based on their effectiveness in producing effective recommendations. In such a case, the weighting value of a producer module to be registered may be determined as a function of the performance ranking of that producer module relative to the other producer modules to be registered.

After a weighting value has been assigned to a producer module 406, whether by assignment operation 604, assignment operation 608, or assignment operation 610, a registry operation 612 registers the producer module with the relevancy module 400. In general, the registry operation 612 adds information about the producer module 206 being registered to a file or files accessible by the relevancy module 400. Such information may include, for example, the location of the module within the network and/or computing environment, the memory requirements of the producer module, the format of the data sent to and received from the producer module, etc.

Communication between the relevancy module and the various producer modules registered to the relevancy module preferably takes place using a set of routines commonly referred to as an interface. As will be understood by one skilled in the art, various interfaces may be used in providing or defining the communications between the relevancy module and the various producer modules registered to the relevancy module 200. In an example of an interface in one embodiment of the present invention, all producer modules inherit from a general class having a method produce( ), which requires three inputs, and returns a boolean value. One example of the method produce( ) is as follows:

bool produce (Request r, RecommendedList objects)

Where the output of the produce( ) method indicates whether computation is still to be performed.

Figure 7:
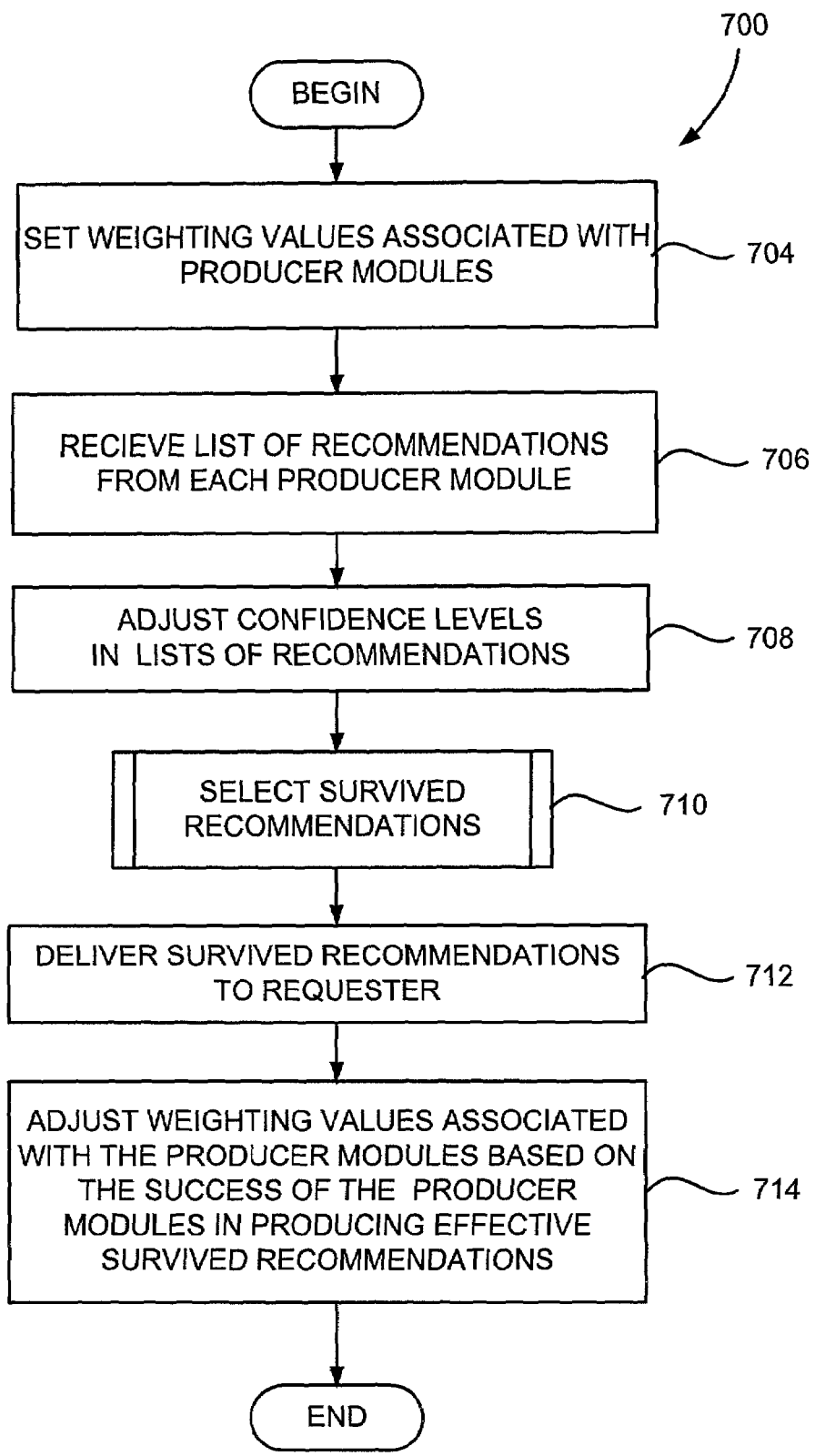
FIG. 7 illustrates an exemplary operational flow for a method for producing relevant recommendations for transmission to a user in a system having a plurality of producer modules.

FIG. 7 illustrates a first method 700 for producing recommendations for transmission to a user in a system having a plurality of producer modules. As shown in FIG. 7, at the beginning of the recommendation production method 700 a setting operation 704 sets initial weighting values, each initial weighting value being associated with one of the plurality of producer modules. A receiving operation 706 then receives a list of initial recommendations from each of the plurality of producer modules. The producers may produce the lists of initial recommendations based on, for example, a request from a requester system for relevant recommendations. Next, an adjustment operation 708 adjusts the confidence levels in the lists of initial recommendations to produce modified lists of recommendations. Each of the confidence levels in a list of initial recommendations may be adjusted based on the weighting value associated with the producer module that produced the list of recommendations.

Following the adjustment operation 708, a selection operation 710 then selects one or more recommendations from the modified lists of recommendations for delivery to a requester. A delivery operation 712 then delivers all or part of the recommendations selected by selection operation 710 to the requester as a list of survived recommendations. An adjustment operation 714 adjusts the weighting value associated with each of the producer modules based on the relative success each of the producer module in producing effective survived recommendations as compared to the success of the other producer modules in producing effective survived recommendations. The success of the each of the producer modules in producing effective survived recommendations may be determined by the adjustment operation 714 based on the success of a particular producer module in producing effective survived recommendations relative to average success of all of the plurality of producer modules in producing effective survived recommendations.

Figure 8:
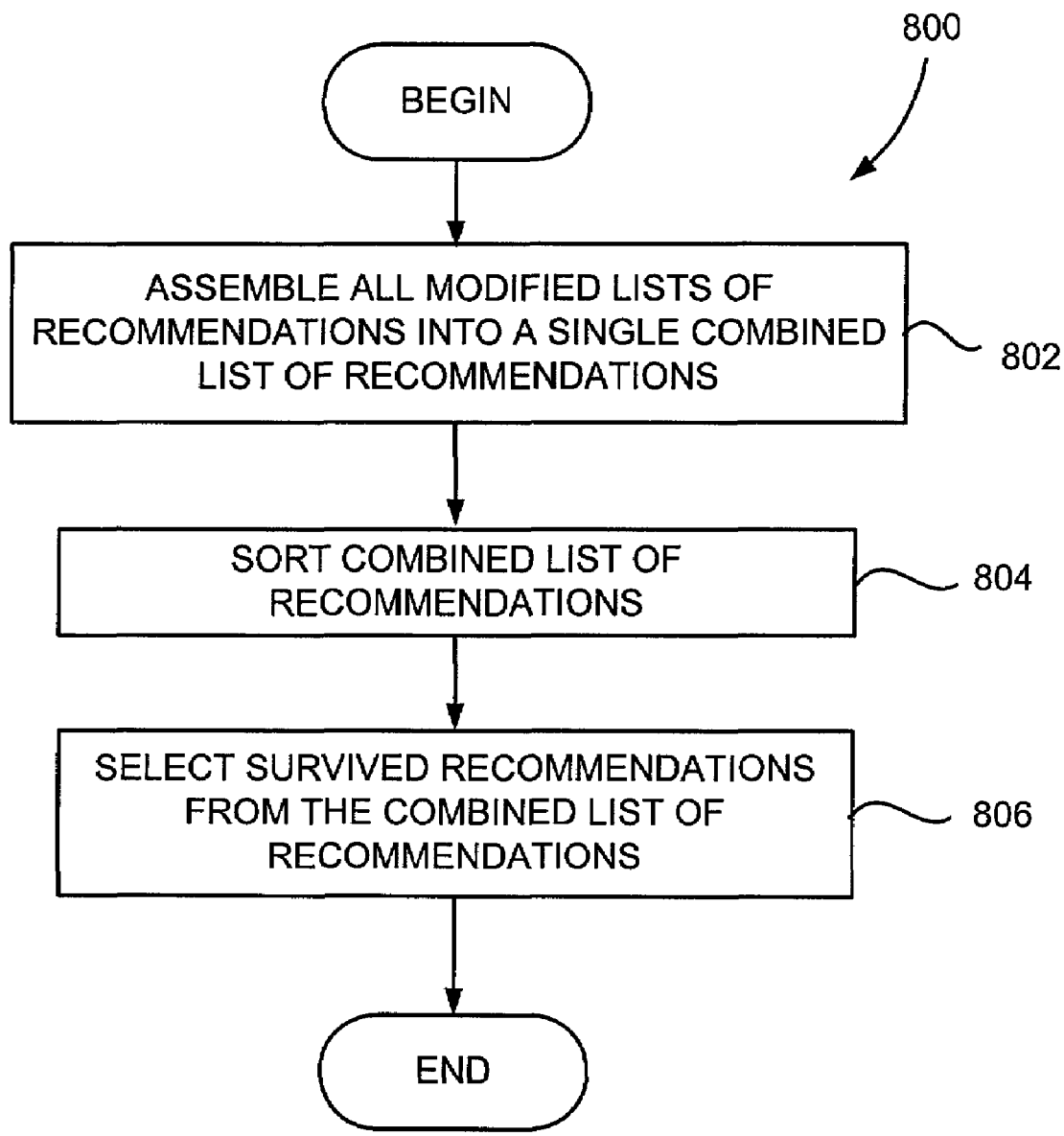
FIG. 8 illustrates an exemplary operational flow for one embodiment of a selection operation of FIG. 7.

In one embodiment of the first method 700, the selection operation is carried out according to the process 800 shown in FIG. 8. As shown in FIG. 8, at the beginning of the process 800 an assembling operation 802 assembles each of the modified lists of recommendations into a single combined list of recommendations. A sorting operation 804 then sorts the combined list of recommendations according to the confidence levels of the recommendations in the combined list. Finally, an identification operation 806 identifies the recommendations.

Figure 9:
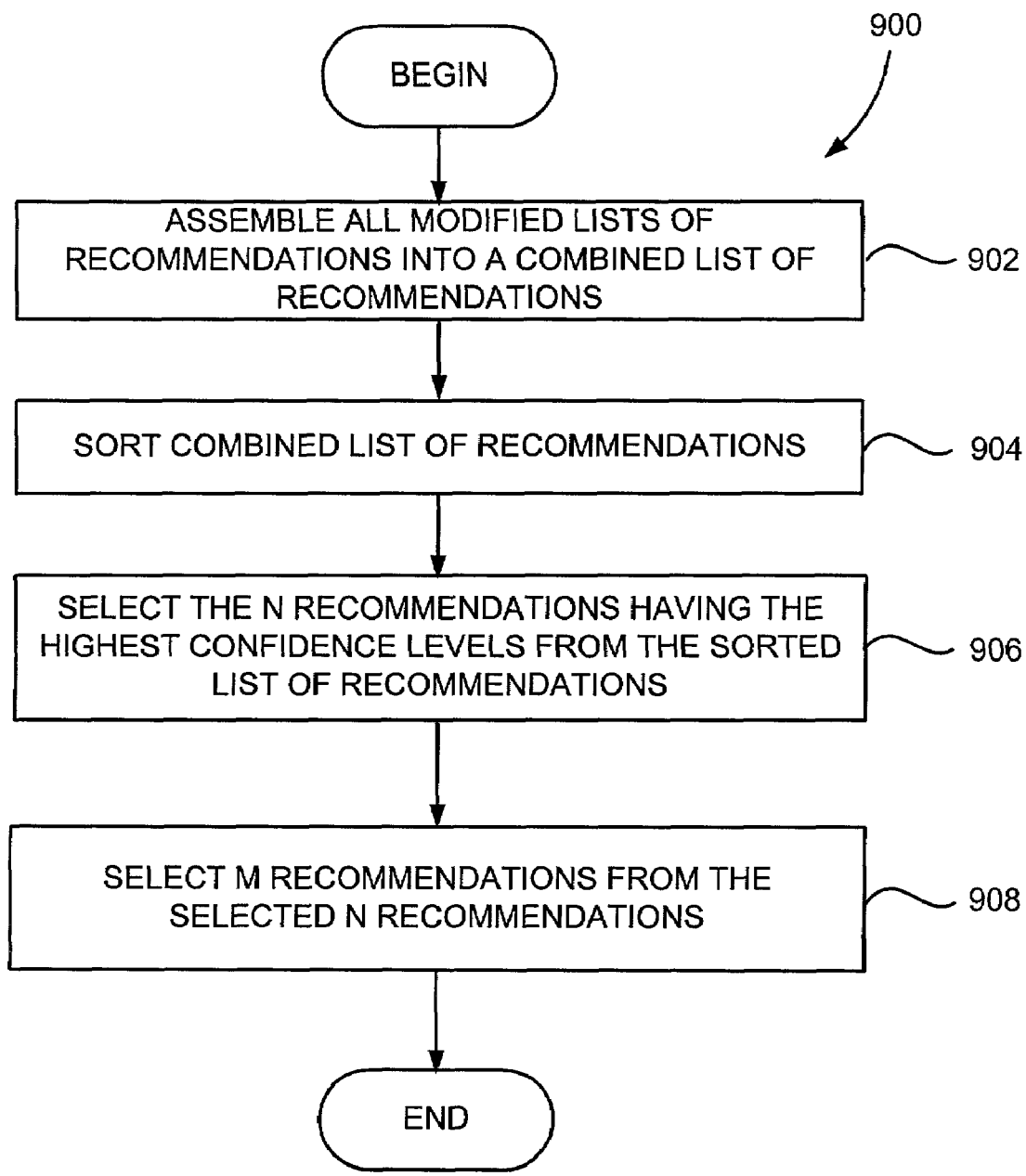
FIG. 9 illustrates an exemplary operational flow for another embodiment of the selection operation of FIG. 7.

In another embodiment of the first method 700, the selection operation is carried out according to the process shown in FIG. 9. As shown in FIG. 9, at the beginning of the process 900 an assembling operation 902 assembles each of the modified lists of recommendations into a single combined list of recommendations. A sorting operation 904 then sorts the modified combined list of recommendations according to the confidence levels of the recommendations in combined list. A first selection operation 906 selects a number N of recommendations having the highest confidence levels in the combined list of recommendations. In this embodiment, the number N may be selected according to the following equation: $N=2*i+1$, where i is a predetermined number of recommendations. The number N may be specified in a request for relevant recommendations from a requester.

Following the first selection operation 906, a second selection operation 908 selects a number M of recommendations from the identified N recommendations. The M recommendations selected from the group of N recommendations are selected according to a selection algorithm that selects recommendations based on the confidence levels of the recommendations. The selection algorithm may select the M recommendations based on the confidence levels of the identified N recommendations. For example, a recommendation in the selected N recommendations having a confidence level of 0.34 would have a 34% likelihood of being selected by the selection algorithm.

Figure 10:
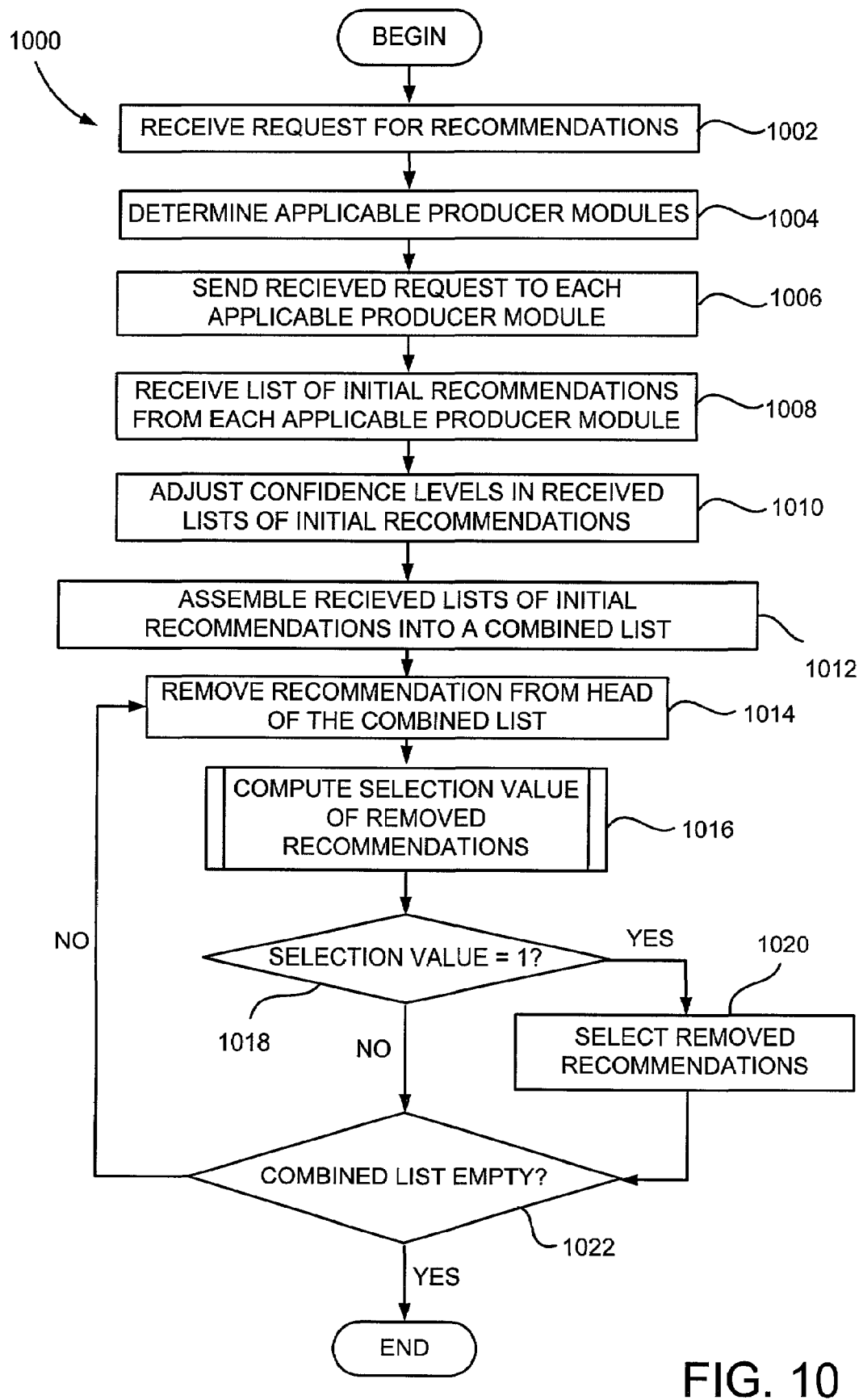
FIG. 10 illustrates an exemplary operational flow for a method for producing relevant recommendations for transmission to a user in a system having a plurality of producer modules.

FIG. 10 illustrates another method 1000 for producing relevant recommendations for transmission to a user in a system having a plurality of producer modules. As shown in FIG. 10, at the beginning of the relevant recommendation production method 1000, a receive operation 902 receives a request for recommendations. The request for recommendations may be received from a requestor system, such as a server process or device, or a user of a server process or device, on a computer network. Following receipt of the request, a determination operation 1004 determines which of the plurality of producer modules are applicable to the request. The determination operation 1004 may determine the applicability of the various producer modules based on information contained in the request as well as information about the operation of the various producer modules. After the determination operation 1004 has determined the applicable producer modules for the request, a send operation 1006 sends the request to each of the applicable producer modules. In response to the receipt of the request, each applicable producer module will generate a list of initial recommendations. In an alternative embodiment of the method 1000, the determination operation 1004 may be omitted and the send operation 1006 would send the request to every producer module. In such a case, the producer modules themselves would determine their applicability to the request and only those producer modules that determined themselves applicable would generate a list of initial recommendations.

Following the generation of lists of initial recommendations by applicable producer modules, a receipt operation 1008 receives the lists of recommendations from each applicable producer module. An adjustment operation 1010 then adjusts the confidence level in each of the received lists of initial recommendations. The adjustment operation 1010 may adjust the confidence levels in a given list of initial recommendations, for example and without limitation, based on a weighting value associated with the producer module that produced the given list of initial recommendations. For example, the adjustment operation 1010 may adjust the confidence levels in a given list of initial recommendations by multiplying each of the confidence levels in the given list of initial recommendations by the weighting value associated with the producer module that produced the given list of initial recommendations.

Next, an assembly operation 1012 assembles each of the lists of initial recommendations adjusted by the adjustment operation 1010 into a single, ordered, and combined list of recommendations. The assembly operation 1012 assembles the recommendations into a single list of recommendations that is ordered according to the confidence levels of the recommendations, with the recommendations having the highest confidence level being at the head of the combined list of recommendations, the recommendations having the next highest confidence level being next in the combined list of recommendations, and so on.

Following the assembly operation 1012, a removal operation 1014 removes the recommendations at the head of the combined list of recommendations and a calculation operation 1016 calculates a selection value for the removed recommendations. The calculation operation 1016 calculates the selection value of the removed recommendations according to a function f(confidence level) which returns either a 1 or a 0, where the chance that the function f(confidence level) returns a 1 is based on the confidence level of the removed recommendation. For example, the function f(confidence level) could take as an input the confidence level of the removed recommendation, generate a random number, compare the generated random number to the confidence level of the removed recommendation, and output a 1 if the confidence level of the removed recommendation is less than the generated random number and output a 0 if the confidence level of the removed recommendation is less than the generated random number.

Next, a determination operation 1018 determines if the selection value of the removed recommendation is equal to 1. If the selection value of the removed recommendation is equal to 1, a selection operation 1020 selects the removed recommendation, the selected recommendation is delivered to the requester system, and the operational flow of the second method 1000 proceeds to a determination operation 1022. If the selection value of the removed recommendation equals 0, selection operation 1020 proceeds to determination operation 1022. Next, determination operation 1022 determines if the combined list of recommendations is empty. If the determination operation 1022 determines that the combined list of recommendations is empty, the operational flow of the second method 1000 returns to the removal operation 1014 and the operation of the method 1000 continues on as shown in FIG. 10.

It will be understood to one skilled in the art that the use of the values 1 and 0 as the values returned by the calculation operation 1016 and as the values employed in the determination operation 1018 is arbitrary. As such, it will be understood that various other values or identifiers may be used as selection values in the place of 1 or 0. Additionally, it will be understood to one skilled in the art that the terms selecting, removing, assembling, receiving, sending delivering, etc., as used relative to recommendations does not necessarily mean that the recommendations are physically moved from one location in memory to another. As is well known in the art, the location of recommendations or other elements in a data structure or memory is typically defined by the relationship of the elements to one another as defined by the rules or format of the data structure or memory.

Various embodiments of the invention and their improvements and advantages have been described. This description has been made by way of examples rather than as a restriction on the invention. The scope of the present invention is defined by the scope of the following claims, and not necessarily by the detailed description of the various embodiments set forth above.

What is claimed is:

1. A recommendation system for delivering a list of recommendations to a requester system over a computer network, the recommendation system comprising:
   a plurality of producer modules in communication with the requester system, each of the plurality of producer modules receiving a request for recommendations from the requester system and producing a list of initial recommendations in response thereto, each of the recommendations in a list of initial recommendations including a confidence level and a producer identifier; and
   a recommendation engine comprising:
      a weighting module modifying each of the confidence levels in a given list of initial recommendations based on a weighting value associated with the producer module that produced the given list of initial recommendations;
      a recommendation module selecting one or more of the recommendations from the lists of initial recommendations based on the confidence levels of the recommendations to produce a list of survived recommendations that are transmitted to the requester system; and
      an adjustment module adjusting the weighting values associated with each of the producer modules based on information from the requester system related to the list of survived recommendations transmitted to the requester system.

2. The recommendation system of claim 1, wherein the recommendation module further comprises:
   an assembler module combining the lists of initial recommendations into a combined list of recommendations;
   a sorting module sorting the recommendations in the combined list of recommendations according to the confidence levels of each of the recommendations in the combined list of recommendations to produce a sorted list of recommendations; and
   a selection module selecting one or more survived recommendations from the sorted list of recommendations to produce the list of survived recommendations.

3. The recommendation system of claim 2, wherein the selection module:
   selects a first predetermined number N of recommendations from the sorted list of recommendations;
   selects a second predetermined number M of recommendations from the first predetermined number N of recommendations, wherein a likelihood of a given one of the M recommendations being selected from the first predetermined number N of recommendations is related to the confidence level of the given one of the M recommendation; and
   selects the one or more survived recommendations from the second predetermined number of initial recommendations.

4. The recommendation system of claim 3, wherein the first predetermined number N is characterized by the equation N=2*i+1, wherein i is a predetermined number.

5. The recommendation system of claim 4, wherein i is a number of recommendations to be transmitted in the list of relevant recommendations, wherein i is transmitted to the relevancy module from the requester system, and wherein M equals i.

6. The recommendation system of claim 1, wherein the weighting module modifies each of the confidence levels in a given list of initial recommendations by multiplying each of the confidence levels in a given list of initial recommendations by the weighting value associated with the producer module that produced the given list of initial recommendations.

7. The recommendation system of claim 1, wherein each of the recommendations in a list of initial recommendations also includes an object identifier.

8. The recommendation system of claim 1, wherein at least one of the recommendations in a list of initial recommendations also includes a request identifier that identifies the request for recommendations from the requester system.

9. The recommendation system of claim 1, wherein at least one of the recommendations in one of the lists of initial recommendations also includes a session identifier that identifies a session on the requestor system.

10. The recommendation system of claim 1, wherein at least one of the recommendations in one of the lists of initial recommendations also includes a recommendation identifier that indicates the list of initial recommendations of which the recommendation was a part.

11. The recommendation system of claim 1, wherein at least one of the recommendations in one of the lists of initial recommendations also includes a uniform resource locator (URL).

12. The recommendation system of claim 1, wherein at least one of the recommendations in one of the lists of initial recommendations also includes a title of a web page.

13. The recommendation system of claim 12, wherein at least one of the recommendations in one of the lists of initial recommendations also includes a summary of the web page being recommended.

14. The recommendation system of claim 12, wherein at least one of the recommendations in one of the lists of initial recommendations also includes an image.

15. The recommendation system of claim 1, wherein the request includes a requester agent.

16. The recommendation system of claim 11, wherein the request includes a universal resource locator key (URL Key).

17. The recommendation system of claim 1, wherein the request includes a Site Identifier (site ID).

18. The recommendation system of claim 1, wherein the request includes a tracking identification attribute (Track ID).

19. The recommendation system of claim 18, wherein the Track ID is a session.

20. The recommendation system of claim 18, wherein the Track ID is a user identifier.

21. The recommendation system of claim 1, wherein the request includes a request number (RecCount) indicating a number of request to be transmitted to the requester system.

22. A relevant object determination system for delivering relevant objects over a computer network to a requester system having one or more users in contact therewith, comprising:
a first producer module and a second producer module, each of the first and second producer modules receiving a request for relevant recommendations from the requester system, the first producer module producing a first list of recommendations in response to the request for relevant recommendations and the second producer module producing a second list of recommendations in response to the request for relevant recommendations, each recommendation including an object identifier, a confidence level, and a producer identifier; and
a recommendation engine comprising:
a weighting module modifying the confidence level in each recommendation in the first list of recommendations based on a first weighting value and modifying the confidence level in each recommendation in the second list of recommendations based on a second weighting value;
a recommendation module, selecting a predetermined number of the recommendations, the recommendation module delivering to the requester system objects identified by the object identifiers in the predetermined number of recommendations and the producer identifiers in the predetermined number of recommendations; and
an adjustment module adjusting the first weighting value and the second weighting value based on inputs from the requester system indicative of reactions of the one or more users to objects sent from the recommendation module to the requester system.

23. The relevant object determination system of claim 22, wherein the recommendation module further comprises:
an assembler module combining the first list of recommendations and the second list of recommendations into a combined list of recommendations;
a sorting module sorting the combined list of recommendations to produce a sorted list of recommendations; and
a selection module selecting from the sorted list of recommendations the predetermined number of recommendations.

24. The relevant object determination system of claim 23, wherein the sorting module sorts the recommendations in the combined list of recommendations according to confidence levels.

25. The relevant object determination system of claim 24, wherein the selection module first selects N recommendations from the sorted list of recommendations and then selects the predetermined number of recommendations from the N selected recommendations, wherein the likelihood of a given one of the recommendations of the predetermined number of recommendations being selected from the N recommendations is related to the confidence level of the given one of the recommendations.

26. The relevant object determination system of claim 25, wherein N is characterized by the equation $N=2*i+1$, and wherein i is a predetermined number.

27. A method of adaptively weighing producer modules in a recommendation system employing a plurality of producer modules, each producer module having a weighting value associated therewith, the method comprising the steps of:
receiving one or more recommendations from each of the plurality of producer modules executing on one or more processing units, each of the received recommendation including a producer identifier indicating which producer module produced the received recommendation and a confidence level;
modifying the confidence level for each of the received recommendations based on the weighting value associated with the producer module that produced the recommendation;
transmitting a plurality of survived recommendations to a requester system executing on one or more processing units, each of the survived recommendations being selected from the received recommendations, the selection of the plurality of survived recommendations based at least in part on the confidence level for each of the received recommendations;

receiving information from the requester system related to the plurality of survived recommendations transmitted to the requester system; and modifying each of the weighting values based on the information received from the requester system.

28. The method of claim 27, wherein the information received from the requester system includes a plurality of user reaction values, wherein each of the plurality of user reaction values is associated with a different one of the plurality of survived recommendations transmitted to the requester system.

29. The method of claim 28, wherein each user reaction value is indicative of a positive user reaction to the recommendation to which the user reaction value is associated.

30. The method of claim 28, wherein each user reaction value is indicative of positive and negative user reactions to the recommendation to which the user reaction value is associated.

31. A method of producing a list of recommendations using a plurality of producer modules, each producer module having associated therewith a weighting value, the method comprising the steps of:

receiving a request for recommendations from a requester system executing on one or more processing units;

transmitting the request to a plurality of producer modules executing on one or more processing units;

receiving a list of initial recommendations from each of the producer modules, every recommendation in a list of initial recommendations having a confidence level and a producer identifier;

modifying each of the confidence levels in each of the lists of initial recommendations based on the weighting value associated with the producer module that produced the list of initial recommendations to produce a list of modified recommendations;

selecting a predetermined number of survived recommendations from the list of modified recommendations;

transmitting the predetermined number of survived recommendations to the requester system;

receiving feedback information from the requester system related to the predetermined number of survived recommendations transmitted to the requester system; and modifying each of the weighting values based on the feedback information received from the requester system.

32. The method of claim 31, wherein the step of selecting a predetermined number of survived recommendations comprises the steps of:

sorting the list of modified recommendations according to the confidence levels of each of the recommendations in the list of modified recommendations to produce a sorted list of recommendations; and choosing the selected predetermined number of survived recommendations from the sorted list of recommendations.

33. The method of claim 32, wherein step of choosing the selected predetermined number comprises the steps of:

selecting a first predetermined number N of recommendations from the sorted list of recommendations;

selecting a second predetermined number M of recommendations from the first predetermined number N of recommendations, wherein the likelihood of a given one of the M recommendations from the first predetermined number N of recommendations being selected as a second predetermined number M of recommendations is related to the confidence level of the given recommendation; and choosing the selected predetermined number of survived recommendations from the second predetermined number M of initial recommendations.

34. The method of claim 33, wherein the first predetermined number N is characterized by the equation $N=2*i+1$, wherein i is a predetermined number.

35. The method of claim 31, wherein the step of modifying each of the confidence levels comprises multiplying each of the confidence levels in a given list of initial recommendations by the weighting value associated with the producer module that produced the given list of initial recommendations.

36. The method of claim 31, wherein each of the recommendations in a list of initial recommendations also includes an object identifier.

37. The method of claim 31, wherein at least one of the recommendations in a list of initial recommendations also includes a request identifier that identifies the request for recommendations from the requester system.

38. The method of claim 31, wherein at least one of the recommendations in a list of initial recommendations also includes a session identifier that identifies the session on the requestor system that motivated the initial request.

39. The method of claim 31, wherein at least one of the recommendations in a list of initial recommendations also includes a recommendation identifier that indicates the list of initial recommendations of which the recommendation was a part.

40. The method of claim 31, wherein at least one of the recommendations in a list of initial recommendations also includes a uniform resource locator (URL).

41. The method of claim 40, wherein the at least one of the recommendations in a list of initial recommendations also includes a uniform resource locator key (URL key) related to the URL.

42. The method of claim 31, wherein at least one of the recommendations in a list of initial recommendations also includes the address of a web page.

43. The method of claim 42, wherein the at least one of the recommendations in a list of initial recommendations also includes a title of the web page.

44. The method of claim 43, wherein the at least one of the recommendations in a list of initial recommendations also includes a summary of the contents of the web page.

45. The method of claim 31, wherein at least one of the recommendations in a list of initial recommendations also includes an image.

46. The method of claim 31, wherein the request includes a requester agent.

47. The method of claim 31, wherein the request includes a standard universal resource identifier.

48. The method of claim 31, wherein the request includes a Site Identifier (site ID).

49. The method of claim 31, wherein the request includes a tracking identification attribute (Track ID).

50. The method of claim 31, wherein the Track ID is a session identifier.

51. The method of claim 31, wherein the Track ID is a user identifier.

52. The method of claim 31, wherein the request includes a request number (RecCount) indicating the predetermined number of survived recommendations to be transmitted to the requester system.

53. The method of claim 34, wherein the request includes a request number (RecCount) indicating the predetermined number of survived recommendations to be transmitted to the requester system.

54. The method of claim 53, wherein i equals the request number.

* * * * *